United States Patent
Barreiro

(10) Patent No.: US 8,135,001 B1
(45) Date of Patent: Mar. 13, 2012

(54) MULTI AD HOC INTEROPERABLE COMMUNICATING NETWORKS

(75) Inventor: Carlos A. Barreiro, Lake Worth, FL (US)

(73) Assignee: Globaltel IP, Inc., Boca Raton, FL (US)

( * ) Notice: Subject to any disclaimer, the term of this patent is extended or adjusted under 35 U.S.C. 154(b) by 997 days.

(21) Appl. No.: 12/148,134

(22) Filed: Apr. 16, 2008

(51) Int. Cl.
  *H04L 12/66* (2006.01)
  *H04L 12/28* (2006.01)
  *H04L 12/56* (2006.01)
  *H04B 7/00* (2006.01)

(52) U.S. Cl. .................. 370/352; 370/401; 455/518

(58) Field of Classification Search .......... 455/518–519, 455/422.1; 370/338, 401, 466
See application file for complete search history.

(56) References Cited

U.S. PATENT DOCUMENTS

| | | | |
|---|---|---|---|
| 6,882,856 B1 | 4/2005 | Alterman et al. | |
| 7,289,493 B1* | 10/2007 | Vera | 370/352 |
| 7,308,462 B1* | 12/2007 | Clarkson et al. | 370/352 |
| 2002/0006137 A1* | 1/2002 | Rabenko et al. | 370/466 |
| 2002/0064137 A1* | 5/2002 | Garakani et al. | 370/278 |
| 2003/0091028 A1* | 5/2003 | Chang et al. | 370/352 |
| 2006/0034260 A1 | 2/2006 | Svedberg et al. | |
| 2006/0080344 A1 | 4/2006 | McKibben et al. | |
| 2006/0092865 A1 | 5/2006 | Williams | |
| 2006/0129628 A1* | 6/2006 | Kamiya et al. | 709/203 |
| 2006/0133454 A1 | 6/2006 | Beckwith | |
| 2006/0168162 A1* | 7/2006 | Woundy | 370/352 |
| 2007/0005804 A1* | 1/2007 | Rideout | 709/246 |
| 2007/0104121 A1 | 5/2007 | Shaffer et al. | |
| 2007/0105578 A1 | 5/2007 | Shaffer et al. | |
| 2007/0124144 A1 | 5/2007 | Johnson | |
| 2008/0200162 A1* | 8/2008 | Chowdhury et al. | 455/422.1 |
| 2008/0310604 A1* | 12/2008 | Agarwal et al. | 379/88.18 |

OTHER PUBLICATIONS

"AudioMate 360 Family: An affordable line of IP gateways for Unified Group Communications," VoiceInterop, 2008.

* cited by examiner

*Primary Examiner* — Nick Corsaro
*Assistant Examiner* — Tangela T. Chambers
(74) *Attorney, Agent, or Firm* — Miller Patent Services; Jerry A. Miller

(57) ABSTRACT

An audio gateway gains access to the network by receipt of network communication parameters from a Dynamic Host Configuration Protocol (DHCP) server via the network interface; and communicates with an audio server to obtain operational attributes for communication with the audio gateway compatible source via the network interface. The audio server receives announcements from the audio gateway to identify the audio gateway as one of a plurality of possible audio gateway types, authenticates the audio gateway, permits user configuration of the audio gateway via an associated configuration screen to permit entry of operational attributes for communication supplied by a user. The audio server sends the operational attributes to the audio gateway type to configure operation of the audio gateway and maintains a database of audio gateways and the audio gateway's respective operational attributes. This abstract is not to be considered limiting.

34 Claims, 14 Drawing Sheets

VoiceInterop™

- ◇ Setup
- ☐ ◆ Devices
  - ☐ ◆ AM360a
    - ◇ Unit2
    - ◇ Unit1
  - ☐ ◆ AM360i
    - ◇ Unit3
  - ☐ ◆ AM360r
    - ◇ 00-03-F4-03-02-0E
- ☐ ◆ Templates
  - ☐ ◆ AM360a
    - ◇ <u>MyTemplateA</u>
  - ☐ ◆ AM360i
    - ◇ MyTemplateI
  - ☐ ◆ AM360r
    - ◇ MyTemplateR ( Refresh )

⎫
⎬ 870
⎭

Copyright © 2008 VoiceInterop
All rights reserved

AUDIOMATE³⁶⁰ Configuration

Name: [MyTemplateA]
RTP IP Address: [192.168.0.5]
RTP Port: [36000]
Codec: [Speex ▼]

Speaker Volume: [10]
Microphone Volume: [5]
Line Out Volume: [5]
Line In Volume: [5]

( Save ) ( Delete ) ( New )

MULTI AD HOC INTEROPERABLE COMMUNICATING NETWORKS

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

Wired and wireless audio communications systems are designed with a number of very different hardware and software defined protocols and frequency bands of operation. These design differences are chosen for specific performance or application benefits such as building penetration or information volume/rate, which unfortunately results in an inability of certain devices (e.g., cellular telephones and two way radios) to seamlessly communicate. A common communication system that can be reconfigured to provide these benefits on demand is not practical so deployment of a multiple ad hoc communications system will often be comprised of a number of different wired and wireless communications elements that can not communicate directly over a common communications network as secure independent talkgroups. While individual talkgroups can be configured using various wireless communication devices, integration of those talkgroups with other talkgroups, virtual talkgroups or individuals is not easily accomplished and is tedious to reconfigure using known technologies in which the configuration is carried out at each individual interface device. This is an impediment to ease of communication between and among users of various communication devices.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which:

FIG. 11 is an example screen shot of another audio gateway configuration page consistent with certain embodiments of the present invention.

FIG. 13 is a flow chart of an example process representing message exchange between an audio server and an audio gateway in a manner consistent with the present invention.

DETAILED DESCRIPTION

Figure 1:
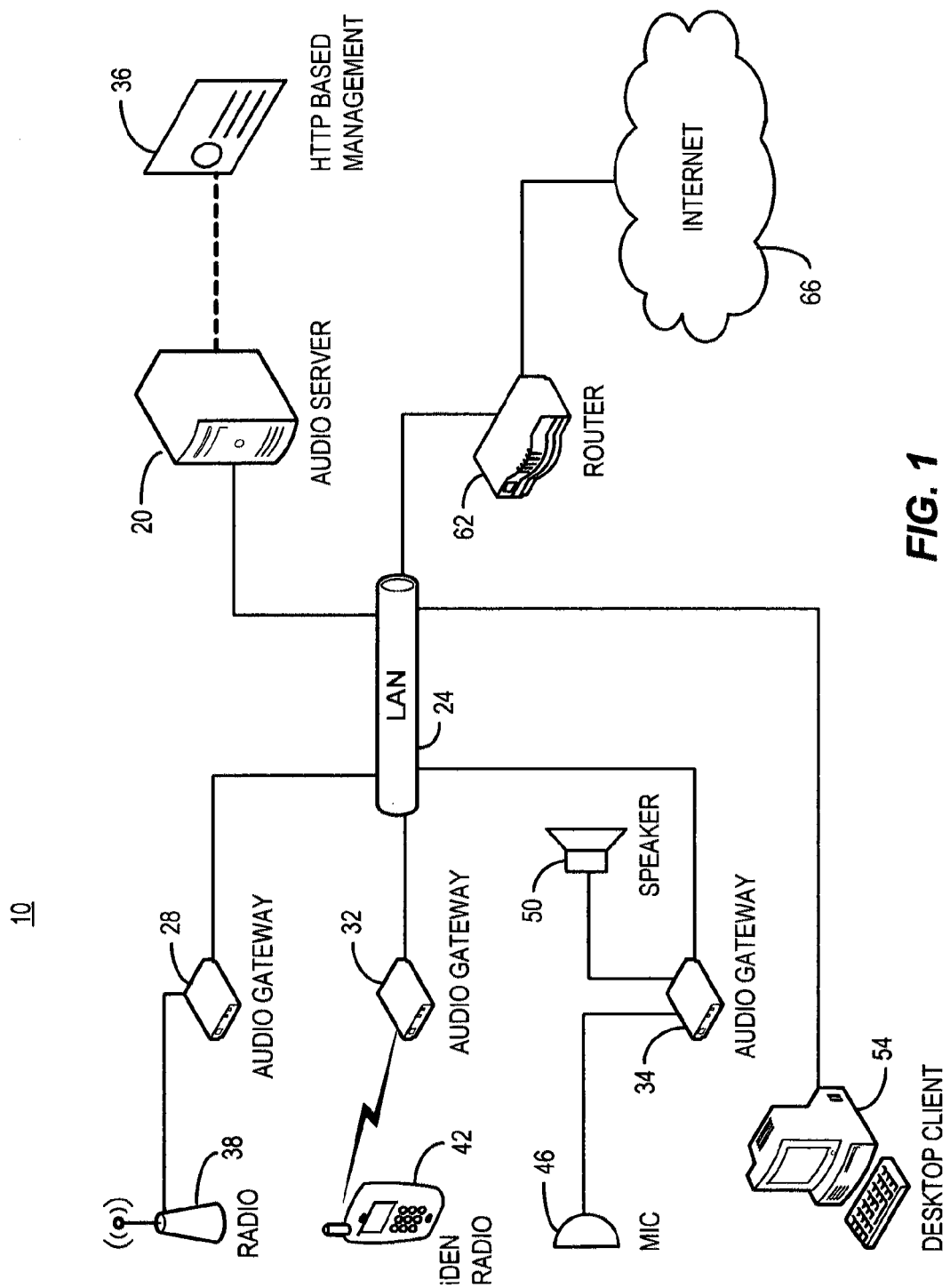
FIG. 1 is a generalized diagram of a network incorporating audio interoperability using audio gateways and an audio server in a manner consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

The terms "parameter" and "attribute" are used interchangeably herein.

The term "audio parameters" is used herein synonymously with "audio attribute" (see above) to mean settings, attributes, functional definitions, parameters or specifications that can be programmed into an audio gateway to establish an audio related personality in the audio gateway. Examples include, but are not limited to audio gains, audio volumes, audio compression algorithms and parameters associated with the compression algorithms, sampling rate, etc.

The term "radio parameters" is used to mean radio communication related settings, attributes, functional definitions, parameters or specifications that can be programmed into an audio gateway to establish a radio communication related personality in the audio gateway. Examples include, but are not limited to frequency, modulation, demodulation and parameters associated therewith. Radio communication is generally distinguished by having a "push-to-talk" functionality, while telephone parameters generally are full duplex communication.

The term "network parameter" is used to mean settings, attributes, functional definitions, parameters or specifications that can be programmed into an audio gateway to establish network communication such as Internet or LAN communication. Examples include IP address, MAC address, subnet mask, protocol, etc.

The term "telephone parameters" is used to mean settings, attributes, functional definitions, parameters or specifications that can be programmed into an audio gateway to establish operation within a conventional wired (POTS, and VoIP) or wireless telephone network.

The term "iDen parameters" or "radio-telephone parameter" is used to mean settings, attributes, functional definitions, parameters or specifications that can be programmed into an audio gateway to establish operation specific to radio telephones compatible with Motorola's iDen series of communication devices. Radio-telephones generally have both a push-to-talk (PTT) functionality (half duplex) and a full duplex communication functionality utilizing their respective cellular telephone infrastructures (i.e., PTT functionality over cellular).

It should be noted that there can be a crossover between telephone and radio parameters and other parameters as defined above. For example, audio gain could translate to FM deviation in an FM transmitter. It is also noted that the audio gateways and operation of the audio server as described herein can be applied to other cellular telephone systems such as CDMA, GSM, etc. without loss of generality. It should additionally be noted that once the communication with the LAN is effected, the communication can be carried with VoIP telephones that can communicate over the LAN.

Any of the above parameters or attributes received by an audio gateway from an audio server to permit proper interaction with radio, telephone, audio equipment, etc. can be considered "operational attribute" or "operational parameters".

The term "AutoAnswer" mode is used to refer to a mode of operation in which an audio gateway is enabled to answer all incoming calls via a telephone network such as a cellular telephone network or an iDen radio network. This mode can be enabled or disabled by setting an attribute.

The term "verbos" mode is use to describe a mode of operation in which an audio gateway sends unsolicited status messages to an audio server. This mode can be enabled or disabled by setting an attribute.

The term "callfilter" is a mode of operation in which only approved calls that match a filtering criterion or identifier will be accepted via a telephone network such as a cellular telephone network or an iDen radio network. This mode can be enabled or disabled by setting an attribute and filtering criteria.

The term "audio buffer" is a mode of operation in which audio is buffered from a user for a period of time (e.g., 10 seconds) while the audio gateway awaits receipt of confirmation from a network that a call has been set up (e.g., via a telephone network such as a cellular telephone network or an iDen radio telephone network). Once the setup is confirmed, the audio is transmitted to the network. This mode can be enabled or disabled by setting an attribute and also may permit selecting an amount of buffering time, for example.

The above modes of operation are consistent with modes used in iDen networks and radios and should be construed to have similar meaning. These modes, however, can be used directly or with modifications in other cellular telephone systems.

The term "talkgroup" as used herein is used in the manner that has become conventional in the art as for example in a push-to-talk radio or radio-telephone such as the iDen series of telephones. However, those talkgroups are normally closed groups in that only entities using compatible radios (e.g., iDen radio-telephones—the term radio-telephone is used as a generic term for iDen telephones and the like which operate as telephones with push-to-talk features) can conventionally be members of a "talkgroup". In accordance with certain embodiments consistent with the present invention, the term encompasses expansive talkgroups or virtual talkgroups or dynamic group calls that can be created using the audio gateways and audio servers in the manner described below.

As noted above, wireless communications systems are designed with a number of very different hardware and software defined protocols and frequency bands of operation. These design differences are chosen for specific performance or application benefits such as building penetration or information volume/rate. A common communications that can be reconfigured to provide these benefits on demand is not practical so deployment of a multi ad hoc communications system will often be comprised of a number of different wired and wireless communications elements that can not communicate directly over a common communications network as secure independent talkgroups. There is a need for an automated method of connecting the different communications elements to a common communications network for registration, security authentication, with independent and possibly multiple talkgroups with simultaneous connectivity that can be reconfigured easily and is readily scalable.

Hence, in accordance with certain embodiments consistent with the present invention, a system, method and various apparatus are devised to provide very fast establishment of multiple stand alone communications systems built with interoperable wired and wireless voice and data communications equipment via a wireless or wired common LAN connectivity. Talkgroups can be configured and the attributes of the audio gateways can be configured centrally with their configuration maintained by one or more audio servers with attributes cataloged to a database at the audio server to provide centralized control over the audio gateways, the call attributes and audio gateway attributes and call acceptance permissions as well as other features which will be clear to those skilled in the art after consideration of the present teachings.

Certain embodiments consistent with the present inventions provide a simple protocol over common open network for registration, security, and connectivity definition for interoperable wireless communications equipment. In addition certain embodiments enable simultaneous connectivity across multiple ad hoc systems over a common open local area network with expansion to remote LANs.

In accordance with embodiments consistent with the present invention, an audio server appliance is used to provide for functional communication among various normally incompatible audio devices using a local area network as a common communication medium. FIG. 1 is a diagram of an example implementation of an audio enabled network installation consistent with embodiments of the present invention. The functionality of the audio server appliance, how it interacts with the various audio IP audio gateways, how it is used within a clients local network will be described below.

FIG. 1 depicts an example network 10 of interconnected audio devices consistent with embodiments of the present invention. A separate audio server 20 is coupled to an organization's local area network (LAN) 24, preferably, but not necessarily, on a separate LAN segment from other corporate data traffic (assuming corporate use). The audio server 20 provides registration/authentication, configuration and management functionality for the various separately LAN connected audio gateways 28, 32 and 34 residing on the network using an HTTP based management interface 36 via use of communication over the LAN.

In an illustrative example, the audio gateways may be VoiceInterop Corporation's AudioMate™ 360 series models AM360r for land mobile radio (LMR) applications as audio gateway 28, which communicates with land mobile radios of various types such as radio 38. Audio gateway 32 can be, for example, a model AM360i for iDen™ (iDen is a trademark of Motorola, Inc., Schaumburg, Ill.) applications for communication with iDen compatible radios such as 42. Audio gateway 34 can be a model AM360a for general audio applications for interconnection with microphone 46 and speaker 50. These devices are commercially available since early 2008 from VoiceInterop, 8000 North Federal Highway, Suite 100, Boca Raton, Fla. 33487. These devices operate as IP voice audio gateways for group communication networks to provide an audio gateway between radios or other audio devices and an IP communication network or talkgroup. They can be used to interoperate conventional or trunked two-way LMR systems, baseband audio sources, or Nextel's iDen™ push-to-talk network, such audio gateways can be used to provide a link that is integrated with WAVE™ (Wide Area Voice Environment) software available from Twisted Pair Solutions, Inc. By modification of the audio side interface, the basic design can be readily modified to accommodate any audio input and output.

The AM360a audio gateway can operate with baseband audio from MP-3 players, radios, analog tape players, CD players, scanner radios, or microphones. A microphone and speaker interface is provided as are audio line level inputs and outputs, and a mini USB diagnostic port. Thus, such an audio gateway permits one to send audio from WAVE to external recording devices or PA systems.

The model AM360i audio gateway permits the popular iDen™ network to be a part of a Unified Group Communications network. Subscriber units on Nextel or private iDen systems can initiate a Direct Connect or Group call to the AM360i to converse with an individual dispatcher or all units on a talkgroup. An iDen modem permits backhaul of data, such as GPS coordinates or SCADA monitors. The audio gateway uses an activated SIM card and 800 MHz antenna to build a bridge to the iDen network. This audio gateway incorporates a SIM card slot to program its features and a 0.6 Watt transmitter and receiver with G.711 µ-law or G.711 A-law 64 kbps codecs, and can be upgraded to provide other codecs. It also incorporates a USB diagnostic port and a 10/100-Base T Ethernet port for LAN connection.

The AM360r can be used to integrate LMR devices to the network. An RJ-45 connector allows for interface to popular 2-way radios. The AM360r extends basic local control functions to the console operating over the IP network. Tone remote control provides additional flexibility to change channels or disable coded squelch for monitoring the channel. The AM360 series of audio gateway devices described above are products of the assignee of the present application which have been recently introduced into the marketplace and are encompassed by certain embodiments described in the present application. These devices can be customized to interface with any audio communication device by modification of the interface to the audio device for compatibility. This audio gateway includes balanced and single ended audio inputs and outputs, PTT output, COR input and mini USB diagnostic port. It also incorporates a USB diagnostic port and a 10/100-Base T Ethernet port for LAN connection.

The AudioMate 360 family of audio gateways produced by VoiceInterop is further described is a set of specification sheets included herewith. All data in such specification sheets were published in early 2008 and are hereby incorporated by reference. This family of audio gateways can be configured locally (i.e., each device configured by a local connection, and advantageously configured and managed from one or more centralized audio servers).

The network 10 is a generalized network which, in addition to the above described devices, may incorporate normal network components such as desktop clients 54, routers 62 and possibly interconnection to wide area networks and the Internet 66. Other conventional network components and appliances can freely interact over LAN 24 in a normal manner in accord with embodiments consistent with the present invention. Additionally, multiple audio servers and many more audio gateways can be added in order to scale the system. Multiple audio servers can be set up to administer devices in various configurations of partitioned networks.

Network 10 provides, via use of the audio gateways such as the example audio audio gateways 28, 32 and 34 (or other configurations of such audio gateways) operating in conjunction with audio server 20 can provide for interoperability of various audio (or video or data) devices such as cellular telephones, two-way radios, and similar audio devices in various ways by definition of any arbitrary set of talkgroups, with a talkgroup being generally two (or even one) or more groups of communication devices. Such talkgroups can be arbitrarily defined with translation taking place at the network 10 according to communication parameters defined by the audio server 20. While not specifically shown, the network can be expanded to communicate with other LANs using WANs or the Internet, effectively rendering the range of workgroups and geographic area of coverage very large.

Hence, a local area network (LAN) 10 can be made up of multiple ad hoc wireless interoperable elements and wired interoperable elements organized in a communicating environment. This network provides security and a set of common communications methods between the different communications protocols of the element members of the multiple ad hoc networks. An open wired or wireless LAN using Dynamic Host Configuration Protocol (DHCP) communications provides connectivity to a number of audio gateway devices to register, receive authentication, and connectivity information for common talkgroups from the audio server controller connected to the common LAN 10. The LAN audio server 20 operates as a controller to provide and update registration information and talkgroup member list instructions to the registered audio gateway elements such as 28, 32, and 34 within the LAN 10 to secure connectivity to remote server/controls and their LAN element's interoperable members (e.g., radios, telephones, etc.) to make up multiple ad hoc talkgroups which can be arbitrarily defined in any combination.

Figure 2:
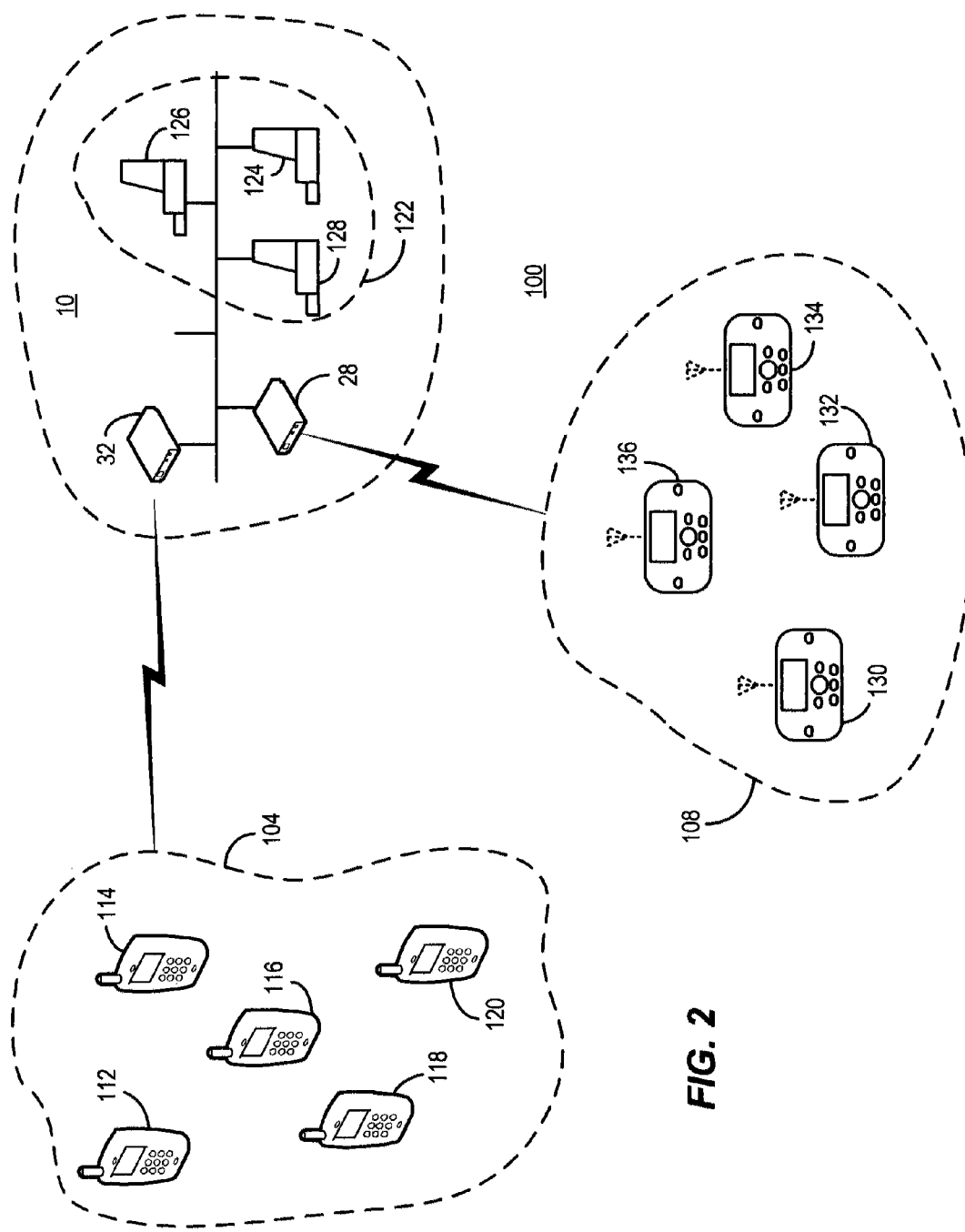
FIG. 2 illustrates the interoperability of various talkgroups within a network consistent with certain embodiments of the present invention.

Referring briefly to FIG. 2, in a conventional arrangement, a plurality of compatible audio devices such as a talkgroup iDen radio/telephones, or other wireless radio communication devices or wired audio terminals can be arranged into individual talkgroups. The arrangement 100 illustrates that a talkgroup 104 of radio/telephones 112-120; wired and networked audio terminals in talkgroup 122 made up of terminals 124-128; and a talkgroup 108 of wireless radio devices 130-136 can be configured into a single larger talkgroup (without regard for intermediate repeaters, base stations, cellular infrastructure and the like) made up of all of the above devices utilizing network 10. Thus, normally incompatible devices such as an iDen radio using push-to-talk mode could communicate directly with talkgroup 108 as well as all members of talkgroup 104 and 122 with the audio gateways providing a common communication interface permitting cross communication among the groups. This interoperability of normally incompatible talkgroups can be utilized, for example, in emergency scenarios wherein various military, police, fire, rescue and coordination personnel can be configured to talk directly with one another.

Figure 3:
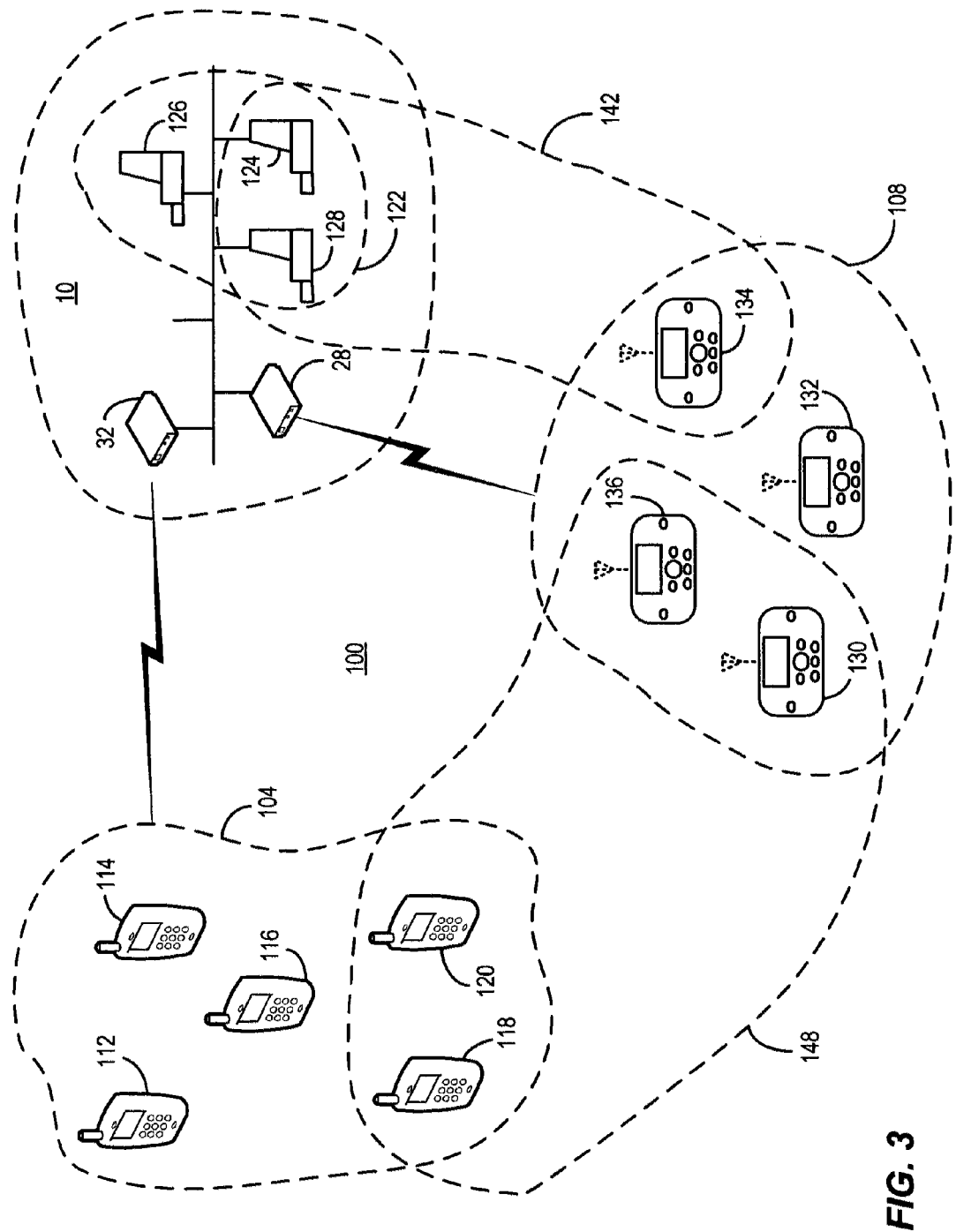
FIG. 3 illustrates a configuration of multiple talkgroups within a collection of audio networks in a manner consistent with certain embodiments of the present invention.

Referring briefly to FIG. 3, utilizing the talkgroup configuration functionality provided for herein, other talkgroups can be defined at will to permit various personnel to use normally incompatible voice communication equipment to effect communications in multiple talkgroups. By way of illustration, devices 124, 128, and 134 from talkgroups 108 and 122 can be configured as a talkgroup, and configured by the user by simply selecting a new talkgroup, much as one would do when placing a telephone call to an entity stored in the memory of a cellular telephone. But, instead of selecting a telephone number or person's name, one simply selects a talkgroups identity. In this scenario, device 134 talks and receives voice through audio gateway 28 when communicating in talkgroup 142. Similarly, terminals 124 and 128 communicate directly with one another in their designed manner, and to and from device 134 through audio gateway 28 in a transparent manner.

In a similar manner, talkgroups such as 148 can be devised in which normally incompatible devices such as those of talkgroup 104 and 108 can readily communicate using network 10 as an intermediary. Thus, talkgroup 148, made up of devices 118 and 120 from talkgroup 104, and devices 130 and 136 from talkgroup 108 communicate via audio gateways 32 and 28 respectively via network 10.

Figure 4:
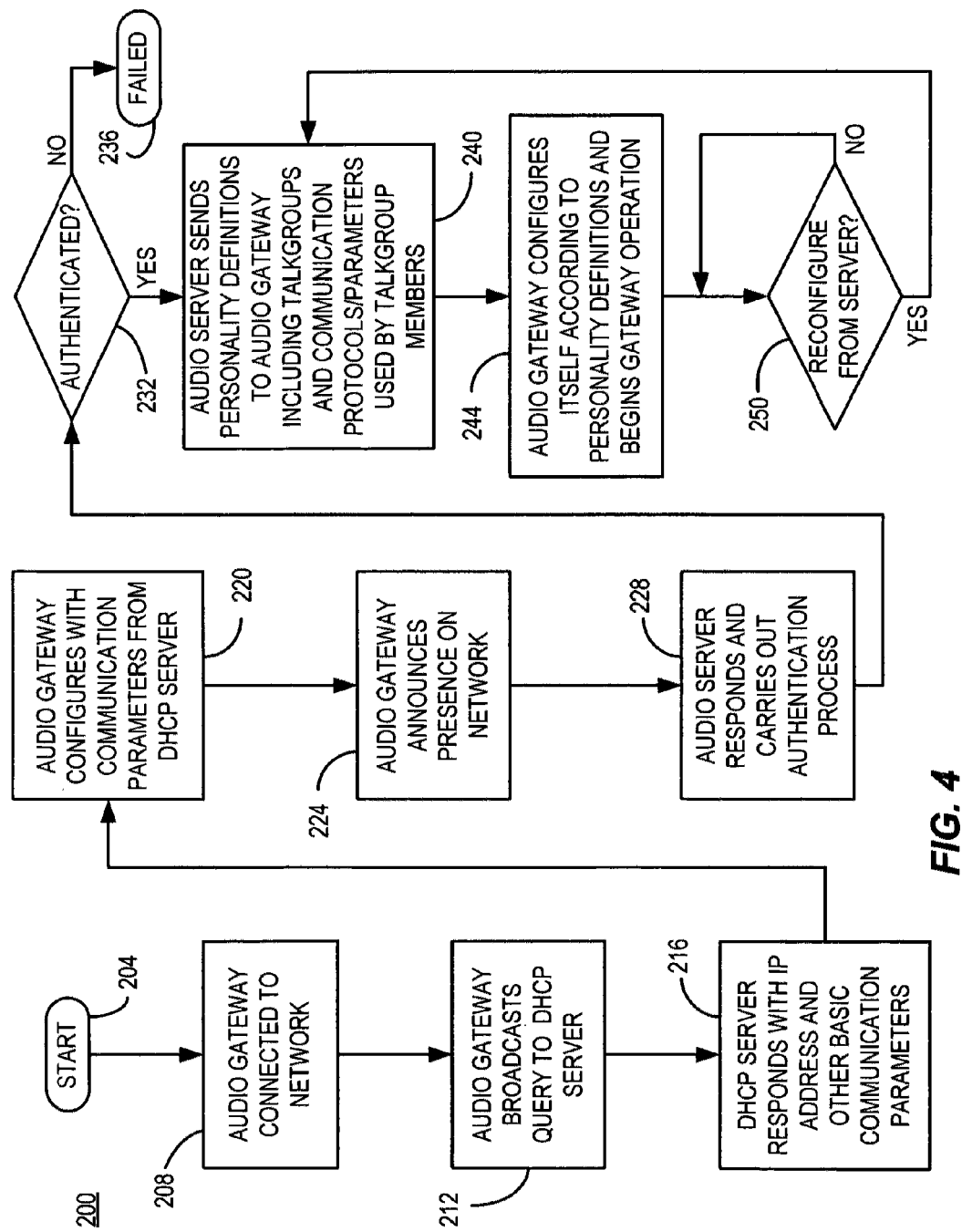
FIG. 4 is a flow chart depicting the operation of an audio gateway in the process of connection, authentication and configuration in a manner consistent with certain embodiments of the present invention.

Referring now to FIG. 4 is a flow chart depicting the operation of an audio gateway in the process 200 of connection, authentication and configuration in a manner consistent with certain embodiments of the present invention. The process starts at 204 after which the audio gateway is connected to the network, powered up, rebooted, reinitialized or the equivalent at 208. The audio gateway then broadcasts a query at 212 over the network in search of an active Dynamic Host Configuration Protocol (DHCP) host. DHCP automates the assignment of IP addresses, subnet masks and other Internet Protocol communication parameters in a conventional manner. When the audio gateway sends its broadcast query at 212, it requests the necessary information for IP communication on the network from a DHCP server (which may be implemented within the audio server or elsewhere on the network. The DHCP server maintains and manages a pool of IP addresses and information about client configuration parameters in order to service such queries. Upon receipt of a valid request from the audio client the DHCP server assigns an IP address, and other TCP/IP configuration parameters at 216 so that the audio gateway can configure itself so as to be enabled to communicate over the LAN 10 at 220.

Once the audio gateway is configured by the DHCP server for communication over the network, the audio gateway announces its presence on the network at 224. Such announcement is broadcast for receipt by the audio server and may include the following information: MAC address, IP address and a device type indicator (e.g., a model number). When the announcement is received at the audio server 20, the audio server determines if the audio gateway is a recognized or authorized device type and if so carries out an authentication process to authenticate the audio gateway at 228. If the audio gateway device is not authenticated at 232, the authentication fails at 236. In this case, various actions can be taken including alerting a user of the audio server 20, logging the failure, etc. The audio gateway, if it remains active and unauthenticated, may continue to attempt to authenticate periodically.

In the event the audio gateway device is authenticated at 232, control passes to 240 where the audio server 20 sends personality definitions to the audio gateway including talkgroups and communication protocols and parameters used by talkgroup members (e.g., radio, network, telephone, and radio telephone attributes) to which the audio gateway is to be operational. The data sent from the audio server 20 to the audio gateway varies according to the type of audio gateway being configured, since each type of audio gateway may require differing parameters for provisioning the personality of the audio gateway, as will be described later in greater detail. Once the personality definitions are downloaded to the audio gateway at 240, the audio gateway configures itself at 244 according to those personality definitions so that it can begin to function as an audio gateway as intended. It is noted that the above parameters are not intended to be an exhaustive set of parameters, since each audio gateway may utilize differing parameters depending upon the external audio to which it is interfaced (e.g., radio, audio source, telephone network, cellular telephone network, radio-telephone network, etc.). The audio gateway continues to function utilizing the personality definitions that are downloaded from the audio server 20 until such time as the audio server 20 modifies those parameters, or there is a malfunction or reboot that necessitates a reconfiguration. If this happens at 250, control passes back to 240 where a reconfiguration takes place. If a more serious failure occurs, the process may restart at 204. (In certain embodiments, the audio gateway can also be configured by a locally connected computer directly connected, e.g., by a USB port in addition to the central configuration carried out by the audio server.) Many variations of this process will occur to those skilled in the art upon consideration of the present teachings.

Figure 5:
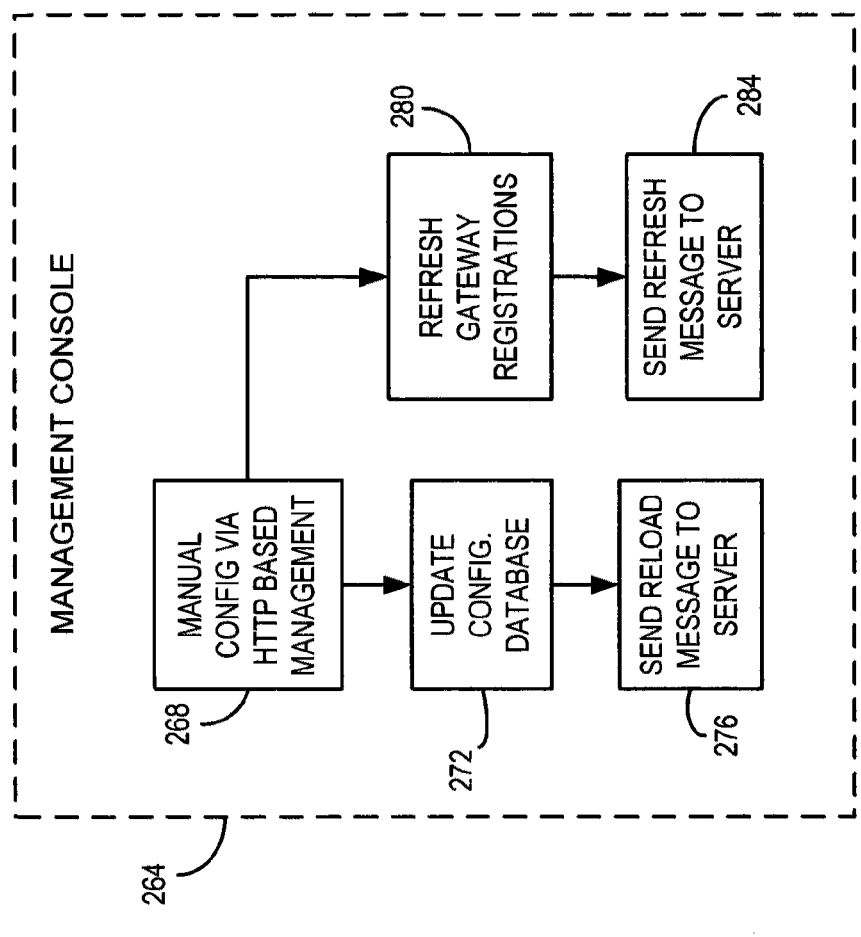
FIG. 5 is a flow chart depicting an example of operation of the management console in a manner consistent with embodiments of the present invention.

FIG. 5 is a flow chart depicting the operation of the basic features of an audio server's management console as process 260. More advanced features can be added as enhancements are made. From this console 264, that is implemented and accessed as a web site, the user can configure and carry out other actions with any audio gateway via manual configuration of parameters using HTTP based management (in the present embodiment, but this should not be considered limiting since other protocols could be utilized) at 268. When configuration entries are made, an audio servers audio gateway database logs the attributes assigned to a given audio server at 272. Once the changes are logged, a reload message is sent at 276 to the server 20 itself, and the audio server 20 carries out the appropriate interaction with the audio gateway to implement the configuration change.

The management console can also be used for other features such as refreshing the audio gateway registrations at 280 in the event a configuration error or other event necessitates a refresh of the registration and configuration of the audio gateways. When a refresh is issued at 280, a refresh message is accordingly sent to the audio server 20 and the audio server 20 attends to issuing registration refresh messages to each of the audio gateways under its control.

Figure 6:
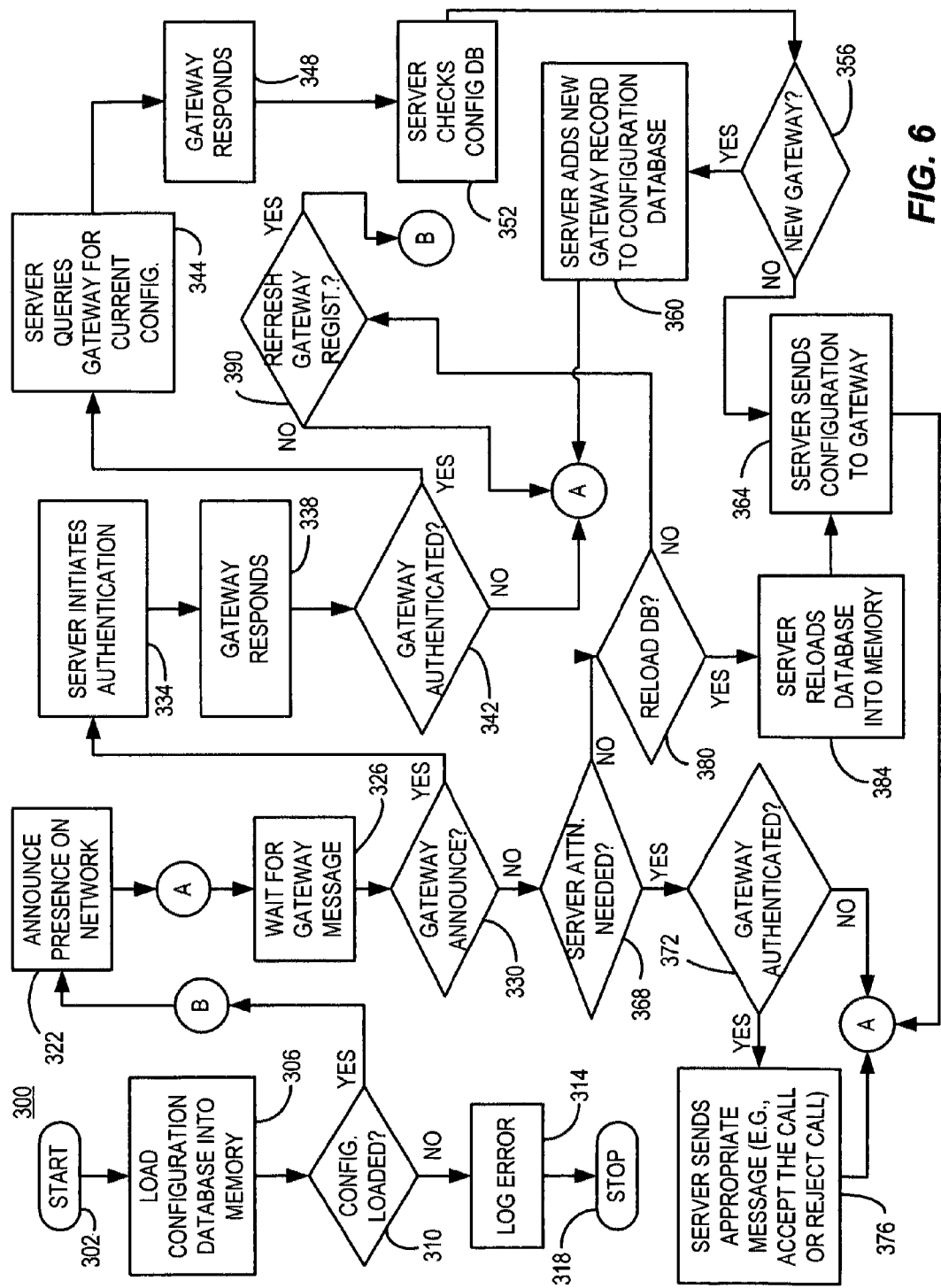
FIG. 6 is a flow chart depicting the operation of an audio server in the process of connection to, authentication of and configuring of an audio gateway in a manner consistent with certain embodiments of the present invention.

FIG. 6 is a flow chart of the operation of the audio server 20 shown as process 300 starting at 302 after which the configuration database is loaded into memory at the audio server 20 at 306. At 310, if the configuration failed to fully and properly load, an error is logged at 314 and/or any other suitable error action is carried out (e.g., alerts, messages, etc.) and the process may be halted at 318. If the configuration loaded correctly at 310, the audio server 20 announces its presence on the network at 322 using a User Datagram Protocol (UDP) broadcast message (for example), using AudioMate Communication Protocol (AMCP—which will be described below) for message formatting and content, to its IP segment announcing itself as having joined the LAN. Control then passes to 326 where the audio server 20 awaits announcements from any audio gateways on the network. Audio gateways are configured to respond to audio server 20 announcements with announcements of their presence in order for the audio server to carry out authentication and configuration operations.

If an audio gateway announcement message is received at 330, control passes to 334 where the audio server 20 determines information from the audio gateway device such as a device type, revision, or other information that operates to inform the audio server 20 of the audio gateway's personality and capabilities and presence on the network 24, and initiates an authentication process. The audio gateway responds at 338 and if the audio gateway properly authenticates at 342, the audio server 20 permits the audio gateway to login to the network 24. If the audio gateway fails to authenticate, a failure action can be taken (e.g., logging the event, display of a message, etc.) and the process returns to 326 to await the next audio gateway message.

The audio server 20 queries the audio gateway for its current configuration at 344. The audio gateway responds at 348 and the audio server 20 checks its audio gateway database at 352 to determine if the audio gateway is new to the network at 356. If so, an audio gateway management screen is populated and displayed for a user to configure the audio gateway. The manual configuration commands can then be entered directly or by use of assignment of a template to the audio gateway and adjusting as desired by the user the audio server 20 is instructed by the management console to and control passes to 360 where the audio server 20 adds the new record to the audio gateway database and control returns to 326 to await another audio gateway announcement. If the audio gateway is not new to the network at 356, the audio server 20 sends the configuration stored in the audio gateway database to the audio gateway at 364. Many variations in this basic operation will occur to those skilled in the art upon consideration of the present teachings.

In the present embodiment, a generalized illustration is depicted for processing other actions at the audio server 20. The audio server 20 can be configured for many such actions including iDen type call setups or other cellular, telephone or other actions. In such case, if an audio gateway announcement is not being processed at 330, a chain of decisions can be made to account for action on for any message received which calls for audio server 20's intervention. Thus, if the message is not an audio gateway announcement, it is examined to see if it is for any other message requiring audio server 20's attention at 368. Generally, the audio server 20 checks to see if the message comes from a valid authenticated audio gateway at 372 and if not, the message can be ignored or logged and control returns to 326. If the audio gateway is valid and authenticated at 372 the audio server 20 responds in a manner suitable to the attention required. In one example, an iDen, GSM, CDMA, etc. call may be being received at 362, or a verbose mode status message may be received. If so, and the audio gateway is authenticated at 372, the audio server 20 sends a message to accept or reject the call according to the attributes associated with the audio gateway and the call or take any other suitable action associated with the message at 376. Other actions will occur to those skilled in the art upon consideration of the present teachings.

If no general call related message or other message needs attention at 368, the audio server 20 determines if a database reload command has been issued at 380 from the management console 264. If so, the audio server 20 reloads the audio gateway database into memory at 384 and the audio server 20 sends configuration data to the audio gateways at 364.

If no reload database command has been issued at 380, the audio server 20 determines if a refresh audio gateway registration command has been issued from the management console 264 at 390. If so, control passes to 322, and if not control passes to 326.

As one skilled in the art will appreciate upon consideration of the present teachings, a number of other commands could be implemented using a chain of decisions regarding incoming messages that are added to the chain of 330, 362, 380, and 390 without departing from embodiments embraced by the present invention.

In the present embodiment, manual configuration of an audio gateway is the norm. When a new audio gateway is authenticated at 342, in certain embodiments a default configuration can be implemented if the audio server 20 is configured to provide such service. If so, the audio server 20 sends default personality definition parameters to the audio gateway including talkgroups, protocols, level settings, etc. This update is then stored in an audio gateway management database in the audio server 20.

Hence, registration and configuration of a new audio gateway can be accomplished as described above. Using any suitable open or proprietary control protocol to 'talk' to the audio gateways the audio server 20 continually looks for new audio gateway registration attempts. When an audio gateway is first connected to the LAN it acquires its IP address via Dynamic Host Configuration Protocol DHCP. Once an IP address has been assigned to the audio gateway it sends a User Datagram Protocol (UDP) broadcast message (for example), using AudioMate Communication Protocol (AMCP—which will be described below) for message formatting and content, to its IP segment announcing itself as having joined the LAN. The audio server 20 captures the broadcast message and sends the appropriate response. Once this 'handshake' has completed the audio server 20 and the audio gateway will have acquired each other's IP address and set up a point to point channel for the two devices to exchange messages over.

When an audio gateway is first connected to the LAN, has acquired an IP address and has completed registration it will be in a state where it will be ready to receive its unique configuration parameters. The audio server 20 places the audio gateway's MAC and IP addresses in the management interface where an administrative user can define the various aspects of the device in question. Such definition can include a default definition that can be used for certain types of devices so that no user intervention is required. Once a user has completed defining the device parameters or a default configuration is implemented, the management interface sends the configuration data to the audio gateway, again using AMCP for formatting and content. If an audio gateway has previously been configured and it attempts to register with the audio server 20, due to it being removed from the LAN temporarily for example, the audio server will send its configuration immediately upon completion of the registration phase.

Figure 7:
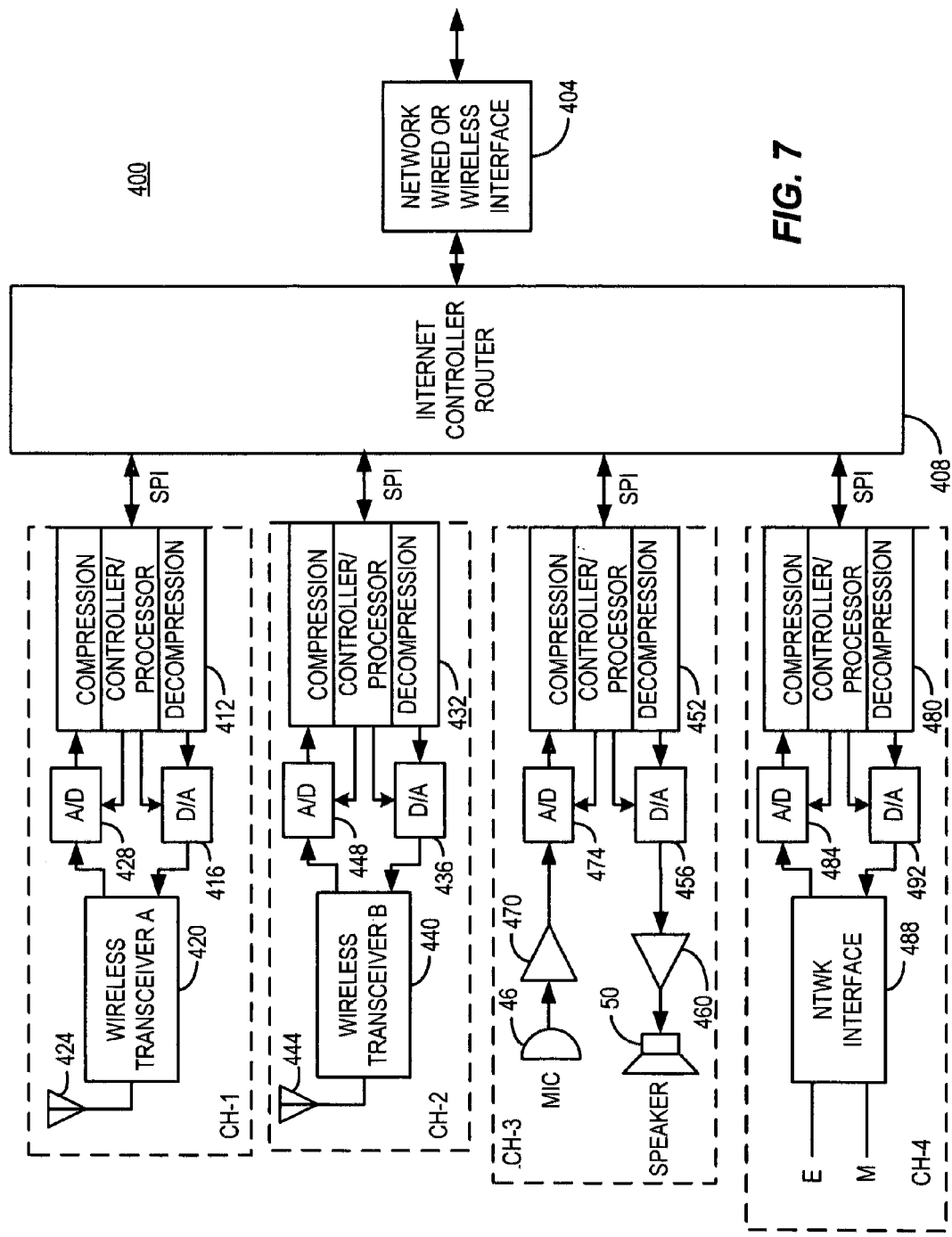
FIG. 7 is a block diagram of a generalized audio gateway consistent with certain embodiments of the present invention.

Referring now to FIG. 7, a generalized audio gateway is depicted. For purposes of this example, the audio gateway depicted as having multiple personalities and compatibilities for ease of illustration, but it will be understood that one or more personalities and channels per audio gateway can be readily realized upon consideration of this "hybrid" example embodiment. Audio gateway 400 is depicted in block diagram form. This audio gateway is representative of any number of audio gateway configurations which may be adapted for use as any of audio gateways 28, 32 or 34 or customized to provide audio gateway services to other sources of audio. Audio gateway 400 is coupled to a LAN or WAN or other IP based Internet or other network access using a wired or wireless network interface 404. Communication can then be carried out with the network (e.g., network 24). Signals to and from the network via network interface 404 is then processed by an Internet controller/router 408 which operates in a manner similar to that of a conventional router, except that it is routing audio packets in and out of the network.

In the embodiment pictured as 400, four separate channels are provided for communication with audio devices, but it will be understood that this example is presented showing multiple channels as a teaching illustration of an audio gateway. In current embodiments, only a single channel is provided in each audio gateway (28, 32 or 34). Any number of channels can be provided without limitation. The first channel (CH-1) depicted is at the top where the router 408 communicates with a controller/processor 412, for example via a serial peripheral interface (SPI) interface or other suitable interface. Audio packets from the Internet controller/router 408 are passed to the controller/processor 412 for processing (e.g., by decompression or decryption or other decoding functions) before being converted to analog signals at D/A converter 416. Once in analog form, wireless transceiver 420 processes the audio as a wireless transceiver of type "A" would ordinarily do (i.e., possibly encode, filter, modulate, amplify, sense idle channel, and transmit) to produce a signal suitable for transmission at antenna 424 in accord with whatever processes are needed to produce an output signal of type "A". Type A could be FM, CDMA, FDMA, GSM, AM, or any known or to be developed wireless communication technique. (It should be noted that the figures do not include radio control items such as PTT sense, PTT activate, idle channel sense, private line detection, open squelch, etc, but one skilled in the art will appreciate that these attributes may also be used in connection with wireless transceiver compatible devices.)

Incoming modulated audio signals are received at antenna 424 and converted to digital form at analog to digital converter 428 for processing by compression and conversion to packetized data at 412 for processing by Internet controller/router 408. The packetized data are then passed via interface 404 to the network.

The second channel (CH-2) is depicted next to the top and behaves in a similar manner, except for use of a second communication paradigm shown as wireless type "B". Again, the router 408 communicates with a controller/processor 432 via an SPI interface. Audio packets from the Internet controller/router 408 are passed to the controller/processor 432 for processing (e.g., by decompression or decryption or other decoding functions) before being converted to analog signals at D/A converter 436. Once in analog form, wireless transceiver 440 processes the audio as a wireless transceiver of type "B" would ordinarily do (i.e., possibly encode, filter, modulate, amplify and transmit) to produce a signal suitable for transmission at antenna 444 in accord with whatever processes are needed to produce an output signal of type "B". As above, type B could be FM, CDMA, FDMA, GSM AM, or any known or to be developed wireless communication technique.

Incoming modulated audio signals are received at antenna 444 and converted to digital form at analog to digital converter 448 for processing by compression and conversion to packetized data at 432 for processing by Internet controller/router 408. The packetized data are then passed via interface 404 to the network.

The third channel (CH-3) is shown as a general audio channel. The third channel is depicted next to the bottom and is used to send and receive audio signals of a general nature. As depicted, a microphone 46 and speaker 50 are depicted, but any audio system can readily be interfaced to channel three by creating appropriate audio impedance and signal levels. Again, the router 408 communicates with a controller/processor 452 via an SPI interface. Audio packets from the Internet controller/router 408 are passed to the controller/processor 452 for processing (e.g., by decompression or decryption or other decoding functions) before being converted to analog signals at D/A converter 456. Once in analog form, the signal may be amplified or buffered at 460 for output to a speaker or any suitable audio system.

Incoming audio signals are received at from a source such as microphone 46 or any other suitable audio source and may be amplified or attenuated at 470 to achieve a suitable signal level for conversion to digital form at analog to digital converter 474 for processing by compression and conversion to packetized data at 452 for processing by Internet controller/router 408. The packetized data are then passed via interface 404 to the network.

The fourth channel (CH-4) is shown as a network interface channel. The fourth channel is depicted at the bottom and is used to send and receive audio signals via the E and M terminals. Incoming audio signals are applied to the network interface 488 and are passed along as analog signals for conversion to digital form at analog to digital converter 484 for processing by compression and conversion to packetized data at 480 for processing by Internet controller/router 408. The packetized data are then passed via interface 404 to the network.

Figure 8:
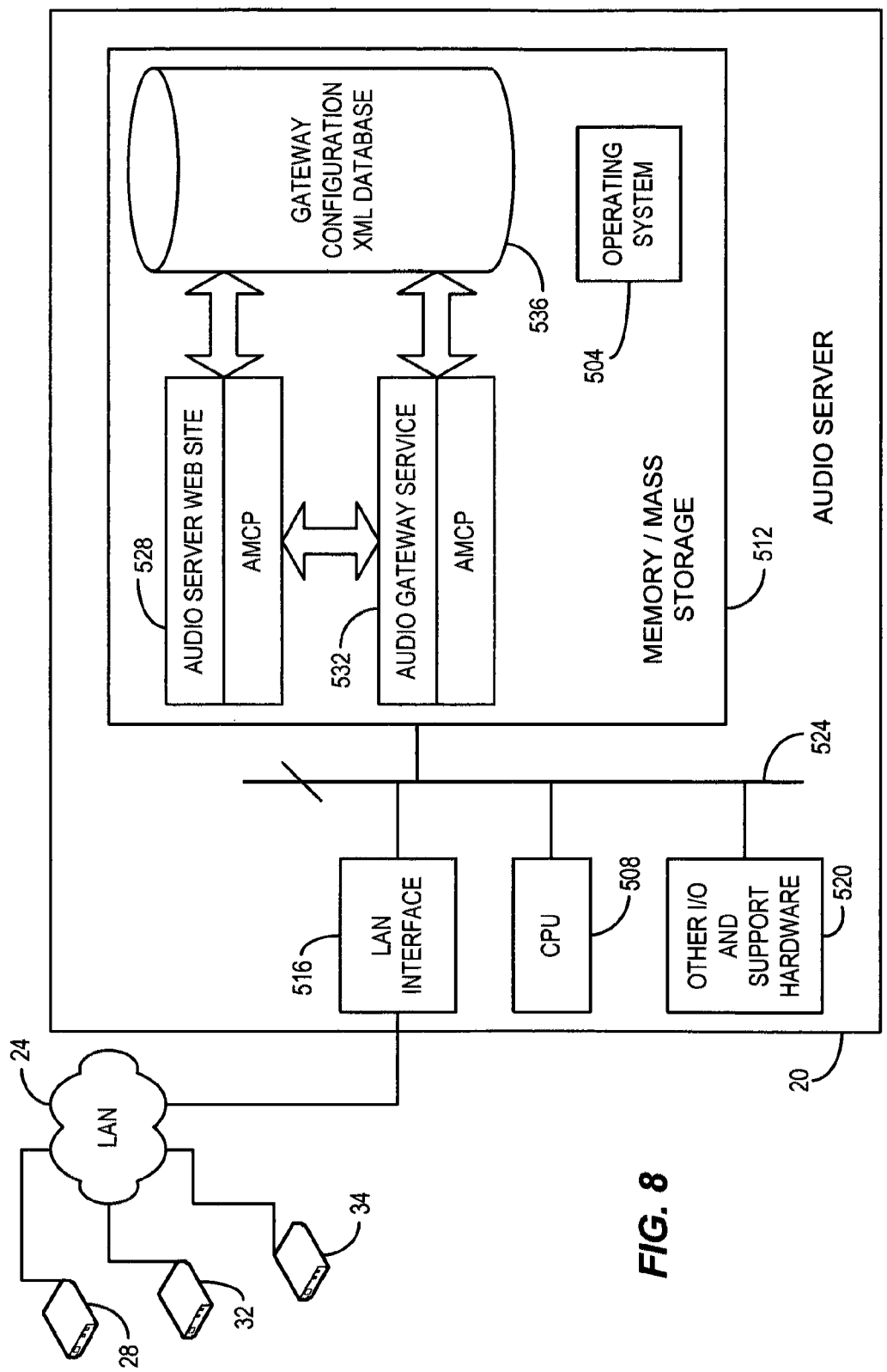
FIG. 8 is a block diagram of an audio server consistent with certain embodiments of the present invention.

The Internet controller/router 408 is programmed by the audio server 20 so as to know what type of addressing to use when communicating over the network, and to know what communication parameters that the wireless transceivers 420 and 440 can use. Moreover, any generalized audio parameters used by the third channel, and any telephone related parameters required by the fourth channel are stored at 408 and programmed or programmable by the audio server 20. The controller/processors 412, 432, 452, and 480 are shown as distinct processors, but could be combined into a single more powerful processor, or split among multiple processors in other equivalent arrangements. Similarly, although four A/D converters and four D/A converters are depicted, it may be possible to utilize one or two of each with the conversions being carried on by sampling or buffering data and multiplexing the various signals to one or two A/D or D/A units without loss of generality. Additionally, although four separate channels are depicted, this should be viewed as a convenience for illustration. One or more channels may be provided in an audio router, and may be configured with any combination of interfaces without departing from embodiments consistent with the present invention. That is, the audio router could be configured as any mixture of channel types including other types not explicitly described above. Those skilled in the art will appreciate, upon consideration of the present teachings, that many variations in the architecture are possible without departing from embodiments consistent with the present invention. These can include other audio gateway media such as data, pictures, and streaming video mixed with audio gateway equipment on a common AM360 audio gateway device Referring now to FIG. 8, a block diagram of an audio server 20 device consistent with certain embodiments of the present invention is depicted. In this illustrative embodiment, the audio server 20 operates using any suitable computer platform such as a Windows XP™ (trademarks of Microsoft Corp.) based computer, in which the Windows XP operating system 500 is installed. The audio server 20 includes all of the hardware that could be expected to be found in a general purpose computer used as a network server such as a central processor unit (CPU) 508, memory and mass storage devices 512 of various configurations as well as a network interface adapter (e.g., a 10/100 Base-T Ethernet adapter) 516 as well as other conventional I/O and other support and peripheral hardware depicted as 520, all interconnected by one or more bus structures depicted as 524 for ease of illustration.

The audio server 20 architecture is stored as software used to program CPU 508 to operate as the audio server 20 and includes an audio server web site 528 that is used as a user interface to allow a user to have access to the audio gateway service processes 532. Events and configuration information can be logged to and stored in an audio gateway database 536 that is preserved in non-volatile storage such as a disk drive. The audio server web site 528 and the audio gateway service processes 532 interact with one another and with the audio gateways (e.g., 28, 30 and 32 in this example illustration) using the AMCP control protocol as will be described later, via the LAN 24 (or a WAN or the Internet).

The audio server 20 can be accessed for reprogramming and evaluated over the Internet from any Internet connected terminal by navigating to the audio server address and carrying out any operations permitted by the audio server 20 including configuration, reconfiguration, refreshing or stopping operation on either the audio server or the audio gateways. Reprogramming for updates and feature enable and disable can also be accomplished from any location to determine operational issues and provide for corrective measures, thus reducing the need for a site visit for routine maintenance.

Figure 9:
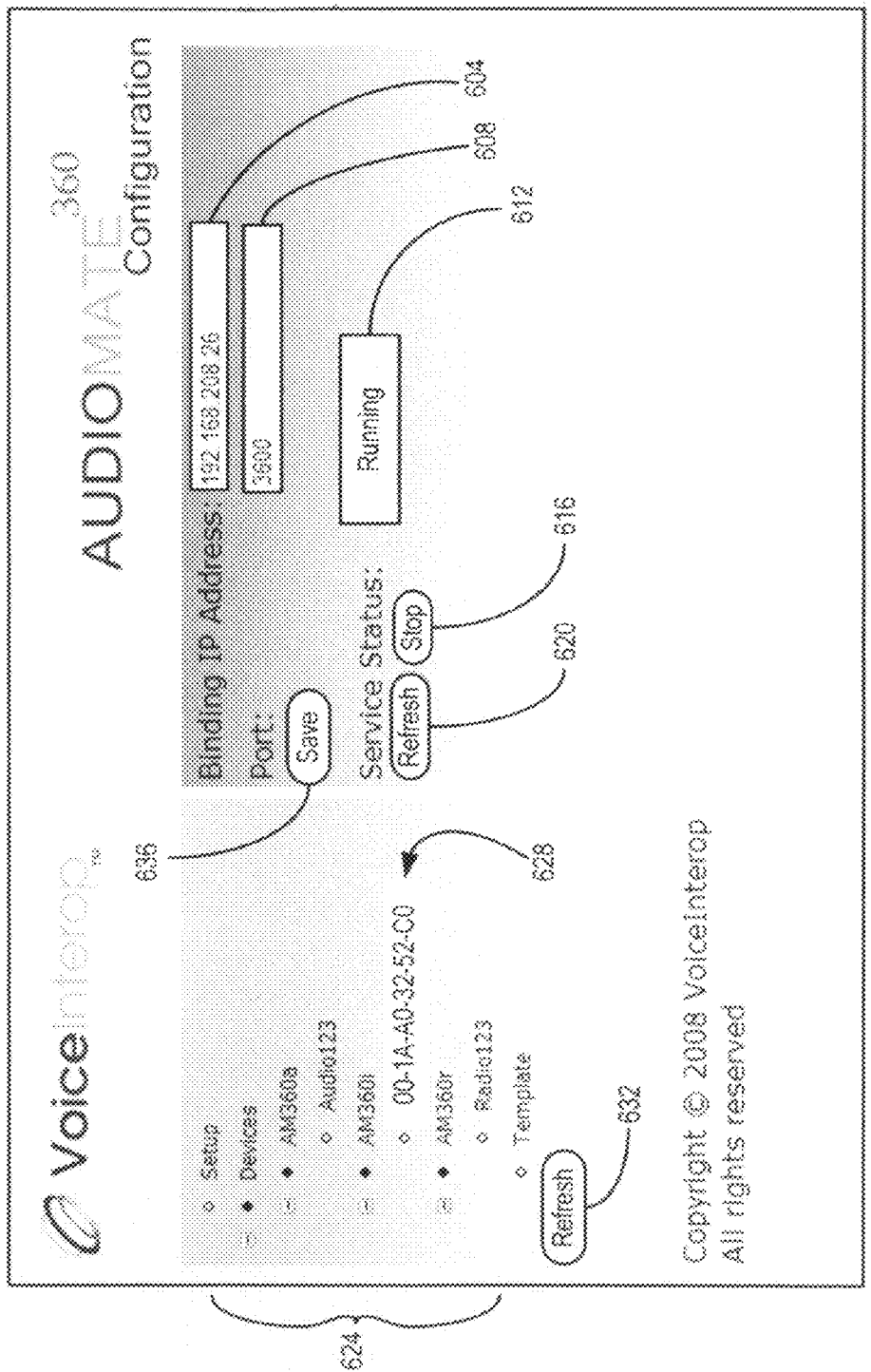
FIG. 9 is an example screen shot of a management console for managing audio gateways consistent with certain embodiments of the present invention.

The audio server 20 contains an HTTP based management console as described above in block diagram form for administering the audio gateways. The main console screen is depicted in FIG. 9 as screen shot 600. The console is accessed by the user pointing any suitable Internet browser to the IP address of the audio server 20, specifying the port that the page is being served on; for example http://192.168.208.26: 3600. The management console is then rendered to the screen and shows the IP address as the binding IP address in field 604, the port in field 608 and indicates the current status of the audio server 20 in field 612 (e.g., running) and allows the user to stop (or start if the status is "stopped") or restart (refresh) the audio server 20 by clicking on buttons 616 or 620 respectively. The console also lists each audio gateway currently registered on the LAN grouped by audio gateway type in a hierarchical tree display shown on the left of the screen as 624. Any of the audio gateway lists by type can be collapsed or expanded by clicking on the + or −buttons adjacent the device type. Audio gateways that have been configured are shown with black lettering and any 'friendly' name or nickname (e.g., audio 123 and Radio 123 shown) assigned to them by the administrator. Newly registered audio gateways are shown with red lettering and designated by their respective MAC addresses (e.g., 00-1A-A0-32-52-C0 in this example would be shown in red). Clicking on a particular device loads the configuration on the page for that particular device so that the user can edit the fields and save the changes as needed. The display can be refreshed by clicking on the refresh button 632, and the present configuration can be saved to disk at the audio server 20 by clicking on the Save button 636.

Figure 10:
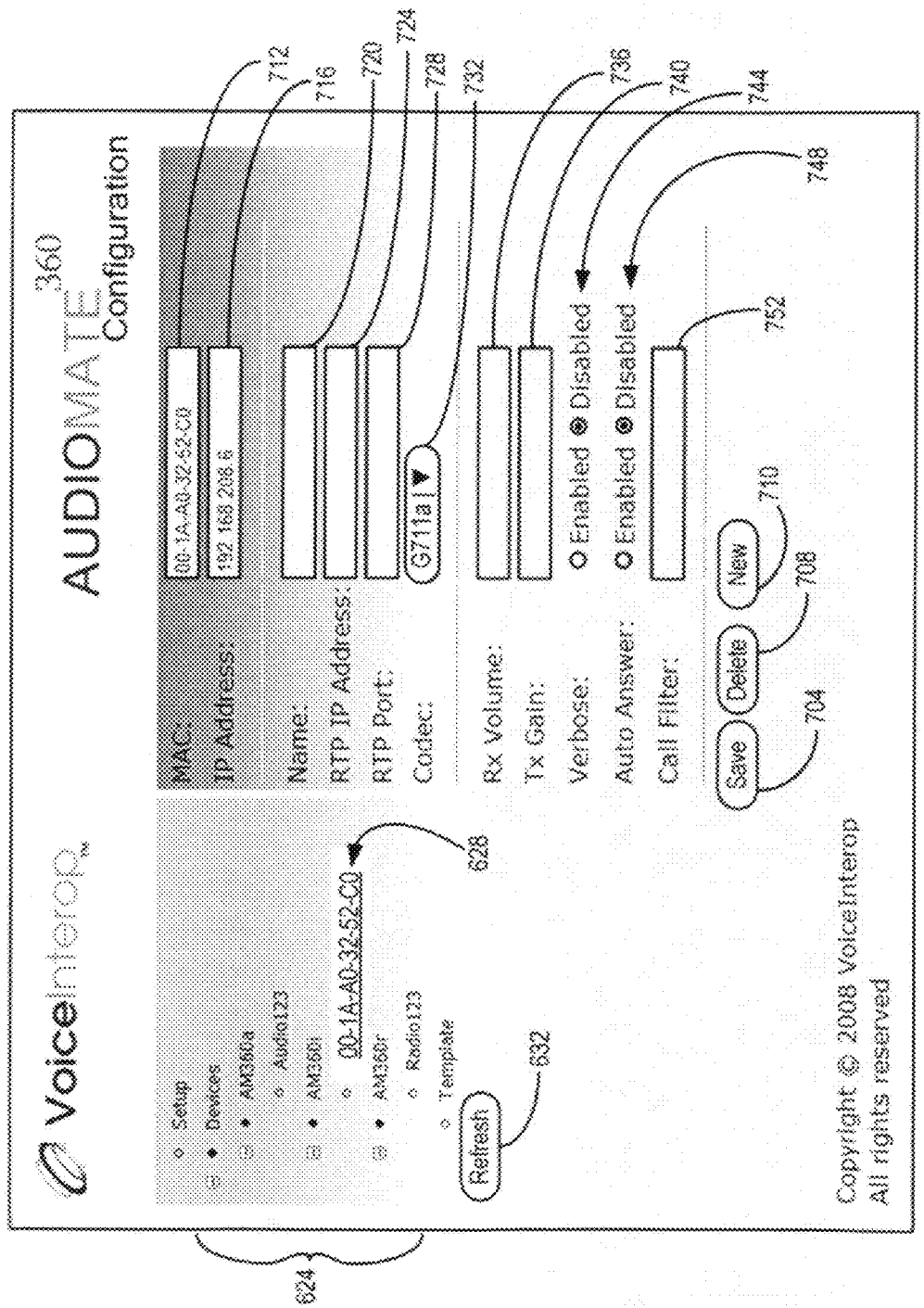
FIG. 10 is an example screen shot of an audio gateway configuration page consistent with certain embodiments of the present invention.

An example of an audio gateway configuration page screen shot 700 is depicted as FIG. 10. This screen shot 700 is an example of an iDen audio gateway that has not yet been configured. The page 700 also lists each audio gateway currently registered on the LAN grouped by audio gateway type in a hierarchical tree display shown on the left of the screen as 624. The right side of the screen depicts all of the variables that can be set by default or user control for the particular type of audio gateway at hand. In this case, the audio gateway is an AudioMate 360i as discussed above; hence, the selectable parameters are those that are currently applicable to the AM360i audio gateway. Other audio gateways may be populated with different parameters that are set by the audio server 20. The Clicking the Refresh button 632 will cause the management console to re-load its configuration. Any newly registered audio gateways will be displayed. The Save button 704 save the configuration file to disk at the audio server 20 and sends the configuration parameters to the selected audio gateway. The Delete button 708 removes the selected audio gateway from the configuration file. The New button 710 is used to create a new configuration for a new audio gateway. Note that if the deleted audio gateway registers itself at a later time it will reappear on the list. In this example, the selected audio gateway is depicted as the AM360i audio gateway having MAC address 00-1A-A0-32-52-00 as shown in selected field 628 and in MAC address field 712. The IP address assigned to this audio gateway is shown in field 716. For an AM360i, the user is able to configure the audio gateway by filling in the fields in the screen. In this case, the audio gateway can be configured with name in field 720, RTP IP address in field 724, RTP port in field 728, Codec in field 732 (in this case G711a codec is used, but using a pull down menu all available codecs will be revealed), receive volume in field 736 (on any suitable scale), transmit gain in field 740 (using any suitable scale), enable or disable verbose mode at 744, set or disable automatic answer at 748, and establish a call filter at field 752. Other parameters may be called for with different types of audio gateways, and in certain embodiments, default values may be filled in for various audio gateways.

Figure 11:
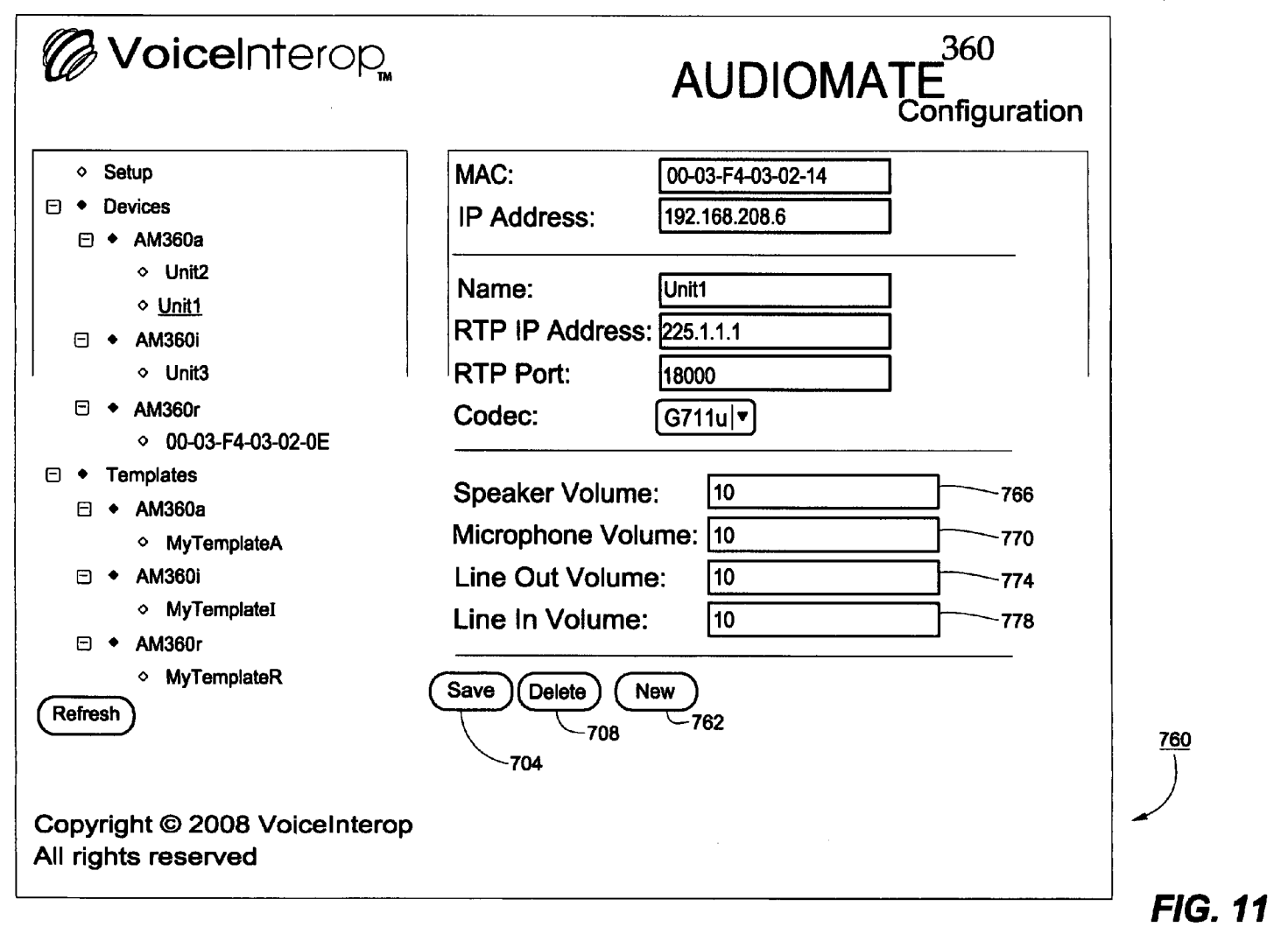

FIG. 11 is a screen shot of a configuration screen 760 for configuring an audio input audio gateway (i.e., such as audio gateway 34). This screen shot resembles screen 700, except that since pure audio devices (as opposed to telephone or radio type devices) are being interfaced to the network, and in this screen shot, the audio gateway has already been configured. Hence, a differing set of parameters are shown for user input. This device has been given the name "unit 1" Parameter 766 represents a speaker volume level (on any suitable scale for the device), parameter 770 represents a microphone volume (gain associated with the microphone input), parameter 774 represents the audio line out volume level, and parameter 778 represents the audio line in volume level. The other parameters are similar to those previously described. A new button 762 can be clicked to clear the fields for adding a new device.

Figure 12:
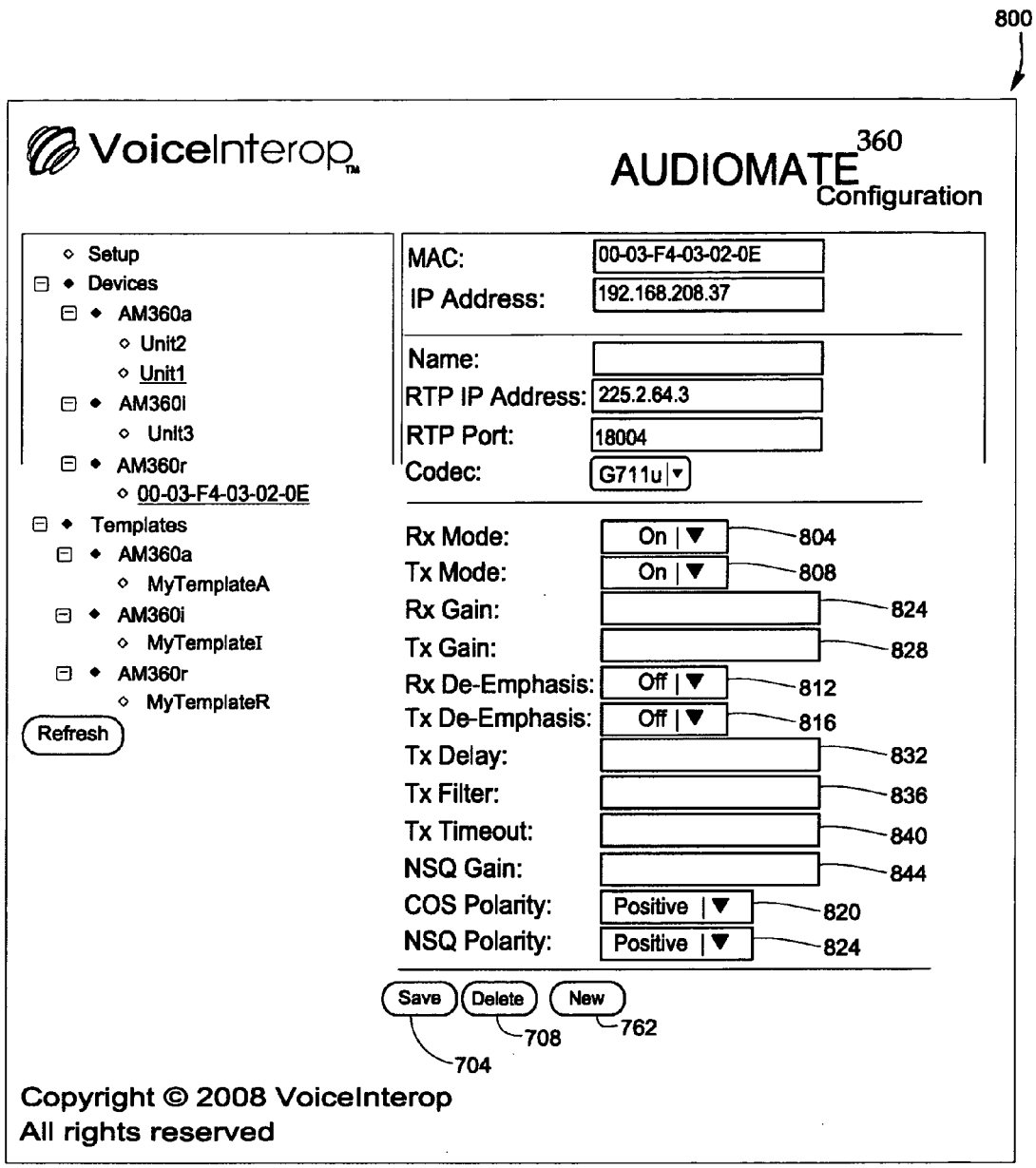
FIG. 12 is an example screen shot of another audio gateway configuration page consistent with certain embodiments of the present invention.

FIG. 12 is a screen shot of LMR compatible audio gateway configuration screen 800 for an audio gateway that has not yet been configured. This screen shot resembles screen 700, except that since land mobile radios (as opposed to telephone or pure audio type devices) are being interfaced to the network. Hence, a differing set of parameters are shown for user input. Parameters 804, 808, 812, 816, 820 and 824 can be configured using drop down menus to configure receive mode, transmit mode, receive de-emphasis, transmit de-emphasis, and COS and NSQ polarities respectively. Data can be directly entered into parameters 824, 828, 832, 836, 840 and 844 to configure receive gain, transmit gain, transmit delay, transmit filter, transmit timeout and NSQ gain respectively.

In terms of functionality, each of the configuration screens can be operated in a similar manner except for the particular parameters of the type of audio gateway being configured. FIG. 13 is a screen shot of a template for an audio input audio gateway that can be configured with values for use by a user when configuring a device. These values are examples only, and are not intended to be default values, which in certain embodiments can be provided for use in configuring a new device. By way of example, when an audio gateway is added to the network. This serves to set certain parameters and then the templates can be assigned to an audio gateway rather than reentry of the same values repeatedly. Templates can be assigned to be "default" templates that can be used to automate or semi-automate the process of assignment of parameters to newly added audio gateways. In such cases, the RTP IP address and port will need to be generated separately so that all audio gateways of a particular type do not attempt to use the same values of these parameters. The data values shown are by way of example. Templates can be configured for any type of compatible device and can be selected from the template area 870 on the left side of the screen.

Figure 14:
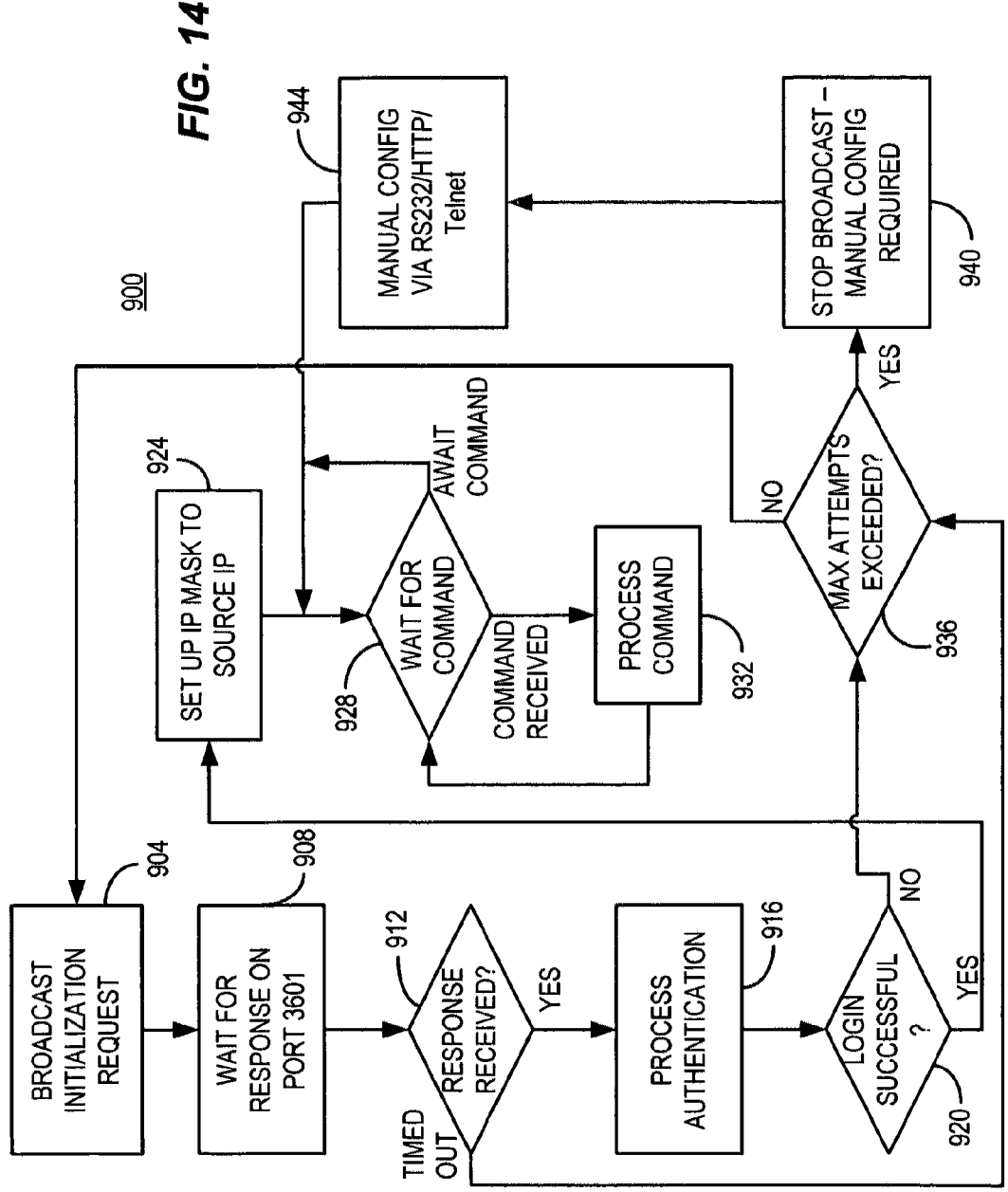
FIG. 14 is a flow chart of an example message exchange process consistent with the present invention.

Referring now to FIG. 14, a process 900 is depicted in flow chart form representing an example message exchange process between the audio server and an audio gateway. The communication is carried out using AudioMate Control Protocol in the preferred embodiment, but this is not to be considered limiting. AMCP is used by the audio server based application in the audio server 20 and the audio gateways (e.g., 28, 30, 32, and 400) to control and monitor the operation of the audio gateways from the audio server 20. The AMCP can be layered over various transport protocols. AMCP provides four basic elements: service discovery, commands, responses, and unsolicited messages.

In process 900, the audio gateway broadcasts an initialization request at 904 and then awaits a response at 908 on a designated port (e.g., 3601). If a response is received before a timeout at 912, an authentication to the audio server 20 is carried out at 916. After authentication, if the login is successful at 920, an IP mask and source IP is set up at 924 for the audio gateway. The audio gateway then awaits a command at 928 until a command is received at 928. When a command is received, the command is executed at 932, and the audio gateway awaits further commands.

If the login is unsuccessful at 920, and the maximum number of attempts has not been exceeded at 936, the process can reinitialize at 904 with broadcast of a new initialization request. However, if the maximum number of attempts have been exceeded at 936, the audio gateway stops broadcasting initialization requests and a manual configuration will be required at 940. Manual configuration can then be carried out via, for example, RS232 connection, HTTP, Telnet, etc. at 944, after which, control passes to 928 where the audio gateway awaits commands.

The provisioning process used to facilitate operation of an audio gateway is as follows. In order for the audio server 20 to work with the audio gateways such as the AM360 series audio gateways described above, the audio gateway announces to audio server that it has joined the network. The audio server then responds accordingly and sends the audio gateway its configuration. This is done by the audio gateway sending a UDP broadcast Register message on port 3600 (it should be noted that the port number is arbitrary and doesn't have to be 3600 as discussed by way of example herein) to its sub-net. The audio server 20 is in a constant listening state, on port 3600, for audio gateways to announcing their arrival. The audio server 20 responds to the IP address it received the Register message from on port 3601 (again, the port number is arbitrary). Once a response message is detected by the audio gateway it will temporary set its incoming IP:Port mask to filter out all messages except those from the audio server's IP address.

Once the audio server 20 has discovered an audio gateway, the audio server authenticates itself to the audio gateway. This will be accomplished via the Login message detailed below. When the audio gateway has verified the authentication, the audio server 20 can begin sending commands.

The audio gateway restarts the provisioning process should it fail to receive any messages from the audio server 20 after a specified period of time.

The audio server 20 sends a UDP broadcast Register message on port 3601 to its sub-net when it is started. Any audio gateways already on the network will respond to the Register message by starting the provisioning process described herein. This is done so that the audio server 20 can identify any audio gateway previously connected to the network prior to the audio server being started.

To increase security of the audio gateway, all command messages are passed through an IP and Port mask filter. The audio gateway will ignore any message that the source IP address and port does not match its programmed mask. The only exception to this is during the discover process. When the audio gateway receives a Login message, it will temporary set the IP:Port mask to the source of the incoming message. If the provisioning process is not completed as described above and within a programmed period of time, the audio gateway returns back to its original IP:Port mask.

Once provisioned as described above, the audio gateway command set uses an XML based format. The XML schema has a root element identifying the AudioMate Control Protocol (AMCP) and five primary child elements (Login, Config, iDenConfig, iDenCall and Status) that identify the available commands. Each child element has various attributes and sub elements that are defined below.

The AMCP root element serves as the message header; used to identify the version number of the protocol, the message type and the query type. The Login element is used to send authentication information. The Config element is used to set various general purpose configuration parameters. The iDenConfig element is used to set AM360i specific parameters used in conjunction with iDen compatible radio telephone devices. The iDenCall element is used to convey AM360i call details. The Status element is used to respond to a configuration status request. Following tables denote the various attributes and sub elements possible within each child element.

By way of example, AMCP elements as used in the Audio-Mate 360 produces are defined in TABLE 1 below, where the term AM360 when used without a suffix such as r, a or i is used as a generic throughout the various tables below used for illustration of an embodiment consistent with the present invention:

TABLE 1

| Element | Type | Use | Sent by | Allowed Values |
|---|---|---|---|---|
| Version | Attribute | Used to define the AMCP version number | AM360 (all variants), Audio server | Current version number |
| Type | Attribute | Defines the type of message being sent or received. | Audio server, AM360 (all variants) | Register - register the AM360 to the Audio server, force AM360 to start provisioning<br>Login - login attempt/response<br>Config - advise AM360 of its config settings<br>Call - advise AM360i of outbound call details, advise Audio server of inbound call details<br>Query - request status, see Query attribute<br>Status - advise Audio server of requested settings (response to a Query) or unsolicited update |
| Query | Attribute | Used to request specific configuration settings from the AM360. The AM360 will respond with a Status message. | Audio server | All - retrieve entire configuration<br>Config - retrieve Config settings<br>iDenConfig - retrieve iDenConfig settings<br>AnalogConfig - retrieve analog settings<br>RadioConfig - retrieve radio settings<br>iDenStatus - retrieve iDen status<br>AnalogStatus - retrieve analog status<br>RadioStatus - retrieve radio status<br>Internals - retrieve AM360 internal settings (model #, serial # etc.)<br>PhoneBook - retrieve iDen phonebook stored in the SIM<br>Codec - retrieve list of available codecs in the AM360 |

TABLE 2 below calls out login parameters used in an example implementation:

TABLE 2

| Element | Type | Use | Sent by | Allowed Values |
|---|---|---|---|---|
| User | Attribute | Used to define user ID of the Audio server for authentication by the AM360 | Audio server | Audio server |
| Password | Attribute | Used to define the user password of the Audio server for authentication by the AM360 | Audio server | Any valid text (subject to security constraints and minimum/maximum number of characters) |
| Status | Attribute | Set to True if AM360 authenticates Audio server login attempt, otherwise set to False | AM360 (all variants) | True False |

TABLE 3 below calls out example configuration elements used in an example implementation:

TABLE 3

| Element | Type | Use | Sent by | Allowed Values |
|---|---|---|---|---|
| Name | Attribute | Descriptive name for the AM360 | AM360 (all variants), Audio server | Any valid text (subject to maximum number of characters) |
| RTP_IP | Attribute | IP address of the AM360 RTP stream | AM360 (all variants), Audio server | Any valid IP address |
| RTP_Port | Attribute | IP port of the AM360 RTP stream, data will be sent to this port + 1 | AM360 (all variants), Audio server | Any valid TCP port |
| Codec | Attribute | Codec to use for RTP stream | AM360 (all variants), Audio server | G711a G711u Raw16 Speex GSM (others can be added) |
| Store | Attribute | When set to True AM360 will store the configuration to non-volatile memory as power on default | Audio server | True False |
| Valid | Attribute | When set to True AM360 has accepted the configuration, when set to False the AM360 has rejected the configuration | AM360 (all variants) | True False |

TABLE 4 below calls our elements used for iDen specific audio gateways such as the AM360i in an example implementation (and may be applicable to other radio-telephone devices in whole or in part):

TABLE 4

| Element | Type | Use | Sent by | Allowed Values |
|---|---|---|---|---|
| RxVolume | Attribute | AM360 receive audio level | AM360i, Audio server | Numeric value (range 0-5) |
| TxGain | Attribute | AM360 transmit audio level | AM360i, Audio server | Numeric value (range 0-31) |
| Verbose | Attribute | When enabled the AM360 will send unsolicited status messages to Audio server | AM360i, Audio server | True False |
| AutoAnswer | Attribute | When enabled the AM360i will automatically answer an incoming call that matches the ID programmed in the CallerFilter. If no ID has been programmed, the AM360 will answer all incoming calls. If AutoAnswer and Verbose are disabled, the AM360 will report at a minimum, the Inbound message | AM360i, Audio server | True False |
| CallFilter | Attribute | When AutoAnswer is enabled, the AM360i will automatically answer an incoming call that matches the ID programmed in the CallFilter. If no ID has been programmed, the AM360 will answer all incoming calls | AM360i, Audio server | Numeric value |
| Store | Attribute | When set to True AM360 will store the configuration to non-volatile memory as power on default | Audio server | True False |
| Valid | Attribute | When set to True AM360 has accepted the configuration, when set to False the AM360 has rejected the configuration | AM360 (all variants | True False |

TABLE 5 below calls out exemplary elements used in configuration of an audio input based audio gateway (such as the AM360a device having audio inputs and outputs) consistent with certain embodiments:

TABLE 5

| Element | Type | Use | Sent by | Allowed Values |
|---|---|---|---|---|
| SpeakerVol | Attribute | Volume level of the speaker output | AM360a, Audio server | Numeric value (range 0-15) |
| MicrophoneVol | Attribute | Volume level of the microphone input | AM360a, Audio server | Numeric value (range 0-15) |
| LineOutVol | Attribute | Volume level of the line out jack | AM360a, Audio server | Numeric value (range 0-15) |
| LineInVol | Attribute | Volume level of the line in jack | AM360a, Audio server | Numeric value (range 0-15) |
| Valid | Attribute | When set to True AM360 has accepted the configuration, when set to False the AM360 has rejected the configuration | AM360 (all variants) | True False |
| Store | Attribute | When set to True AM360 will store the configuration to non-volatile memory as power on default | Audio server | True False |

TABLE 6 below depicts some of elements that can be used in configuring a land mobile radio compatible audio gateway such as the AM360r, by way of example, in certain embodiments consistent with the present invention:

TABLE 6

| Element | Type | Use | Sent by | Allowed Values |
|---|---|---|---|---|
| RxMode | Attribute | Receive mode | AM360r, Audio server | OFF ON COS NSQ COSNSQ |
| TxMode | Attribute | Transmit mode | AM360r, Audio server | OFF ON HalfDuplex FullDuplex |
| RxGain | Attribute | Receive gain | AM360r, Audio server | Numeric value (range 0-63) |
| TxGain | Attribute | Transmit gain | AM360r, Audio server | Numeric value (range 0-63) |
| NSQGain | Attribute | Noise squelch gain | AM360r, Audio server | Numeric value (range 0-31) |
| TxDelay | Attribute | The amount of time to wait before transmitting audio | AM360r, Audio server | Numeric value (range 0-255) |
| TxFilter | Attribute | TBD | AM360r, Audio server | Numeric value (range 0-255) |
| TxTimeout | Attribute | The maximum amount of time to allow continuous audio transmission | AM360r, Audio server | Numeric value (range 0-255) |
| COSPol | Attribute | Carrier operated switch polarity | AM360r, Audio server | 0, 1 |
| PTTPol | Attribute | Push-to-talk polarity | AM360r, Audio server | 0, 1 |
| RxDeEmp | Attribute | Enables or disables receive de-emphasis | AM360r, Audio server | 0, 1 |
| TxDeEmp | Attribute | Enables or disables transmit pre-emphasis | AM360r, Audio server | 0, 1 |
| Valid | Attribute | When set to True AM360 has accepted the configuration, when set to False the AM360 has rejected the configuration | AM360 (all variants) | True False |
| Store | Attribute | When set to True AM360 will store the configuration to non-volatile memory as power on default | Audio server | True False |

It should be clearly understood that the elements depicted in the above TABLES 1-6 are intended to be merely illustrative of the type of configuration elements and attributes that can be established for an audio gateway and audio server as is generally described herein, and should not be considered limiting.

Thus, an audio gateway consistent with certain embodiments gains access to the network by receipt of network communication parameters from a DHCP server via the network interface; and communicates with an audio server to obtain operational attributes for communication with the audio gateway compatible source via the network interface. The audio server receives announcements from the audio gateway to identify the audio gateway as one of a plurality of possible audio gateway types, authenticates the audio gateway, permits user configuration of the audio gateway via a configuration screen associated with the audio gateway type to permit entry of operational attributes for communication supplied by a user. The audio server sends the operational attributes to the audio gateway type to configure operation of the audio gateway and maintains a database of audio gateways and the audio gateways respective operational attributes. Certain embodiments allow for both half and full duplex communication connectivity including buffering audio to overcome half duplexer one-way communication limits. Use of setup via a centralized server permits a more flexible mechanism for control of all gateways used in a network.

Thus, in certain embodiments consistent with the present invention, an audio gateway has an analog audio signal interface receiving audio signals from an audio gateway compatible source, and providing output audio signals to the audio gateway compatible source. An analog to digital (A/D) converter converts the audio signals to a digital format. An audio compressor processes the digital audio signals to produce data compressed audio signals. A packetizer places the compressed audio signals into outgoing data packets. A network interface places the outgoing data packets onto a data network and receives incoming data packets from the data network. A decompresser receives the incoming compressed data packets from the data network and processes the compressed incoming data packets to produce decompressed audio data. A digital to analog (D/A) converter converts the decompressed audio data into an analog audio signal and provides an analog audio signal that is transferred to an output of the analog audio signal interface. One or more processors operate to gain access to the network by receipt of network communication parameters from a DHCP server via the network interface and communicate with an audio server to obtain operational attributes for communication with the audio gateway compatible source via the network interface.

In certain embodiments, the audio gateway compatible source and output are compatible with a land mobile radio (LMR). In certain embodiments, the audio gateway compatible source and output are compatible with a cellular telephone. In certain embodiments, the audio gateway compatible source and output are compatible with a speaker and a microphone. In certain embodiments, the audio gateway compatible source and output are compatible with an audio line level signals. In certain embodiments, the audio gateway compatible source and output are compatible with a radiotelephone. In certain embodiments, at least one of the operational attributes include the status of a verbose mode of operation wherein the audio gateway sends unsolicited status messages to the server via the network interface. In certain embodiments, at least one of the operational attributes include the status of an autoanswer mode of operation wherein the audio gateway automatically answers all incoming calls. In certain embodiments, at least one of the operational attributes include the status of a callfilter mode of operation wherein the audio gateway only answers calls that match an identity defined by call filter attributes. In certain embodiments, at least one of the operational attributes include the status of an audio buffered mode of operation.

In certain embodiments, the operational attributes include at least: the status of a verbose mode of operation wherein the audio gateway sends unsolicited status messages to the server via the network interface; the status of an autoanswer mode of operation wherein the audio gateway automatically answers all incoming calls; the status of a callfilter mode of operation wherein the audio gateway only answers calls that match an identity defined by call filter attributes; and a status of an audio buffered mode of operation. In certain embodiments, upon any one of connection of the audio gateway to the network, powering up the audio gateway or booting the audio gateway, the audio gateway sends an announcement message to the audio server. In certain embodiments, the outgoing data packets are addressed to an address of another audio gateway connected to the network, and the incoming data packets from the data network are from the another audio gateway connected to the network. In certain embodiments, the outgoing data packets are addressed to an address of a recipient device connected to the network, and the incoming data packets from the data network are from the recipient device connected to the network, and wherein the recipient device is not an audio gateway. In certain embodiments, the attributes include radio attributes, network attributes, telephone attributes, or radio telephone attributes. In certain embodiments, the analog audio signal interface includes a radio frequency transceiver. In certain embodiments, the radio frequency transceiver includes at least one of a land mobile radio transceiver, a cellular telephone and a radio frequency radio-telephone. In certain embodiments, the audio gateway compatible source and output are compatible with a POTS or a VoIP telephone interface.

An audio server consistent with certain embodiments has a network interface that places the outgoing data packets onto a data network and receives incoming data packets from the data network. One or more processors communicate with an audio gateway. The one or more processors of the audio server operate to implement an audio server website; receive announcements from the audio gateway; identify the audio gateway as one of a plurality of possible audio gateway types; authenticate the audio gateway; display a configuration screen associated with the audio gateway type to permit entry of operational attributes for communication supplied by a user; send the operational attributes to the audio gateway type to configure operation of the audio gateway; and maintain a database of audio gateways and the audio gateways respective operational attributes.

In certain embodiments, the plurality of possible audio gateway types include at least one of land mobile radio (LMR) audio gateway, radio-telephone audio gateway, telephone system audio gateway, and audio device audio gateway. In certain embodiments, the audio gateway compatible source and output are compatible with a cellular telephone. In certain embodiments, the audio gateway compatible source and output are compatible with a radio-telephone. In certain embodiments, at least one of the operational attributes include the status of a verbose mode of operation wherein the audio gateway sends unsolicited status messages to the server via the network interface. In certain embodiments, at least one of the operational attributes include the status of an autoanswer mode of operation wherein the audio gateway automatically answers all incoming calls. In certain embodiments, at least one of the operational attributes include the status of a callfilter mode of operation wherein the audio gateway only answers calls that match an identity defined by call filter attributes. In certain embodiments, at least one of the operational attributes include the status of an audio buffered mode of operation. In certain embodiments, upon any one of connection of the audio server to the network, powering up the audio server or booting the audioserver, the audio server broadcasts an announcement message over the network In certain embodiments, the attributes include radio attributes, network attributes, telephone attributes, or radio telephone attributes. In certain embodiments, a management console displays the configuration screen as a part of the web site.

An audio communication system consistent with certain embodiments has a data network coupling an audio gateway interface with an audio server interface. The audio gateway has an analog audio signal interface receiving audio signals from an audio gateway compatible source, and providing output audio signals to the audio gateway compatible source. An analog to digital (A/D) converter converts the audio signals to a digital format. An audio compressor processes the digital audio signals to produce data compressed audio signals. A packetizer places the compressed audio signals into outgoing data packets. An audio gateway network interface places the outgoing data packets onto a data network and receives incoming data packets from the data network. A decompressor receives the incoming data packets from the data network and processes the incoming data packets to produce decompressed audio data. A digital to analog (D/A) converter converts the decompressed audio data into an analog audio signal and provides an analog audio signal that is transferred to an output of the analog audio signal interface. One or more audio gateway processors are provided to gain access to the network by receipt of network communication parameters from a DHCP server via the network interface, and communicate with an audio server to obtain operational attributes for communication with the audio gateway compatible source via the audio gateway network interface. The audio server has a server network interface that places the outgoing data packets onto a data network and receives incoming data packets from the data network. One or more server processors communicates with an audio gateway, wherein the one or more processors operate to implement an audio server website, receive announcements from the audio gateway, identify the audio gateway as one of a plurality of possible audio gateway types, authenticate the audio gateway, display a configuration screen associated with the audio gateway type to permit entry of operational attributes for communication supplied by a user, send the operational attributes to the audio gateway type to configure operation of the audio gateway, and maintain a database of audio gateways and the audio gateways respective operational attributes In certain embodiments, the plurality of possible audio gateway types include at least one of land mobile radio (LMR) audio gateway, radio-telephone audio gateway, telephone system audio gateway, and audio device audio gateway. In certain embodiments, at least one of the operational attributes is selected from the following: the status of a verbose mode of operation wherein the audio gateway sends unsolicited status messages to the server via the network interface; an autoanswer mode of operation wherein the audio gateway automatically answers all incoming calls; a callfilter mode of operation wherein the audio gateway only answers calls that match an identity defined by call filter attributes; and a status of an audio buffered mode of operation wherein the audio gateway buffers audio for a specified time period to await confirmation that the radio-telephone network has successfully set up a call. In certain embodiments, a management console displays the configuration screen as a part of the web site.

Those skilled in the art will recognize, upon consideration of the above teachings, that certain of the above exemplary embodiments are based upon use of a programmed processor. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Certain embodiments described herein, are or may be implemented using a programmed processor executing programming instructions that are broadly described above in flow chart form that can be stored on any suitable electronic or computer readable storage medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

Certain embodiments may be implemented using a programmed processor executing programming instructions that in certain instances are broadly described above in flow chart form that can be stored on any suitable electronic or computer readable storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies) and/or can be transmitted over any suitable electronic communication medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. An audio gateway, comprising:
   an analog audio signal interface receiving audio signals from an audio gateway compatible source, and providing output audio signals to the audio gateway compatible source, wherein the audio gateway compatible source and output are compatible with a Plain Old Telephone Service (POTS) or Voice Over Internet Protocol (VoIP) telephone interface;
   an analog to digital (A/D) converter that converts the audio signals to a digital format;
   an audio compressor that processes the digital audio signals to produce data compressed audio signals;
   a packetizer that places the compressed audio signals into outgoing data packets;
   a network interface that places the outgoing data packets onto a data network and receives incoming data packets from the data network;
   a decompresser that receives the incoming compressed data packets from the data network and processes the compressed incoming data packets to produce decompressed audio data;
   a digital to analog (D/A) converter that converts the decompressed audio data into an analog audio signal and provides an analog audio signal that is transferred to an output of the analog audio signal interface;
   one or more processors that:
      gain access to the network by receipt of network communication parameters from a Dynamic Host Configuration Protocol (DHCP) server via the network interface; and
   communicate with an audio server to obtain operational attributes for communication with the audio gateway compatible source via the network interface, wherein at least one of the operational attributes comprise the status of a callfilter mode of operation wherein the audio gateway only answers calls that match an identity defined by call filter attributes.

2. The audio gateway according to claim 1, wherein the audio gateway compatible source and output are compatible with a land mobile radio (LMR).

3. The audio gateway according to claim 1, wherein the audio gateway compatible source and output are compatible with a cellular telephone.

4. The audio gateway according to claim 1, wherein the audio gateway compatible source and output are compatible with a speaker and a microphone.

5. The audio gateway according to claim 1, wherein the audio gateway compatible source and output are compatible with an audio line level signals.

6. The audio gateway according to claim 1, wherein the audio gateway compatible source and output are compatible with a radio-telephone.

7. The audio gateway according to claim 1, wherein at least one of the operational attributes comprise the status of a verbose mode of operation wherein the audio gateway sends unsolicited status messages to the server via the network interface.

8. The audio gateway according to claim 1, wherein at least one of the operational attributes comprise the status of an autoanswer mode of operation wherein the audio gateway automatically answers all incoming calls.

9. The audio gateway according to claim 1, wherein at least one of the operational attributes comprise the status of an audio buffered mode of operation.

10. The audio gateway according to claim 1, the operational attributes comprise at least: the status of a verbose mode of operation wherein the audio gateway sends unsolicited status messages to the server via the network interface; the status of an autoanswer mode of operation wherein the audio gateway automatically answers all incoming calls; and a status of an audio buffered mode of operation wherein the audio gateway buffers audio for a specified time period to await confirmation that the radio-telephone network has successfully set up a call.

11. The audio gateway according to claim 1, wherein, upon any one of connection of the audio gateway to the network, powering up the audio gateway or booting the audio gateway, the audio gateway sends an announcement message to the audio server.

12. The audio gateway according to claim 1, wherein the outgoing data packets are addressed to an address of another audio gateway connected to the network, and the incoming data packets from the data network are from the another audio gateway connected to the network.

13. The audio gateway according to claim 1, wherein the outgoing data packets are addressed to an address of a recipient device connected to the network, and the incoming data packets from the data network are from the recipient device connected to the network, and wherein the recipient device is not an audio gateway.

14. The audio gateway according to claim 1, wherein the attributes comprise radio attributes, network attributes, telephone attributes, or radio telephone attributes.

15. The audio gateway according to claim 1, wherein the analog audio signal interface comprises a radio frequency transceiver.

16. The audio gateway according to claim 15, wherein the radio frequency transceiver comprises at least one of a land mobile radio transceiver, a cellular telephone and a radio frequency radio-telephone.

17. An audio server, comprising:
a network interface that places the outgoing data packets onto a data network and receives incoming data packets from the data network;
one or more processors that communicates with an audio gateway, wherein the one or more processors of the audio server operate to:
implement an audio server website;
receive announcements from the audio gateway;
identify the audio gateway as one of a plurality of possible audio gateway types;
authenticate the audio gateway;
display a configuration screen associated with the audio gateway type to permit entry of operational attributes for communication supplied by a user;
send the operational attributes to the audio gateway type to configure operation of the audio gateway; and
maintain a database of audio gateways and the audio gateway's respective operational attributes.

18. The audio server according to claim 17, wherein the plurality of possible audio gateway types include at least one of land mobile radio (LMR) audio gateway, radio-telephone audio gateway, telephone system audio gateway, and audio device audio gateway.

19. The audio gateway according to claim 17, wherein the audio gateway compatible source and output are compatible with a cellular telephone.

20. The audio server according to claim 17, wherein the audio gateway compatible source and output are compatible with a radio-telephone.

21. The audio server according to claim 20, wherein at least one of the operational attributes comprise the status of a verbose mode of operation wherein the audio gateway sends unsolicited status messages to the server via the network interface.

22. The audio server according to claim 20, wherein at least one of the operational attributes comprise the status of an autoanswer mode of operation wherein the audio gateway automatically answers all incoming calls.

23. The audio server according to claim 20, wherein at least one of the operational attributes comprise the status of a callfilter mode of operation wherein the audio gateway only answers calls that match an identity defined by call filter attributes.

24. The audio server according to claim 20, wherein at least one of the operational attributes comprise the status of an audio buffered mode of operation.

25. The audio server according to claim 17, wherein, upon any one of connection of the audio server to the network, powering up the audio server or booting the audio server, the audio server broadcasts an announcement message over the network.

26. The audio server according to claim 17, wherein the attributes comprise radio attributes, network attributes, telephone attributes, or radio telephone attributes.

27. The audio server according to claim 17, further comprising a management console which displays the configuration screen as a part of the web site.

28. An audio communication system, comprising:
a data network coupling an audio gateway interface with an audio server interface;
the audio gateway comprising:
an analog audio signal interface receiving audio signals from an audio gateway compatible source, and providing output audio signals to the audio gateway compatible source;
an analog to digital (A/D) converter that converts the audio signals to a digital format;
an audio compressor that processes the digital audio signals to produce data compressed audio signals;
a packetizer that places the compressed audio signals into outgoing data packets;
an audio gateway network interface that places the outgoing data packets onto a data network and receives incoming data packets from the data network;
a decompressor that receives the incoming data packets from the data network and processes the incoming data packets to produce decompressed audio data;
a digital to analog (D/A) converter that converts the decompressed audio data into an analog audio signal and provides an analog audio signal that is transferred to an output of the analog audio signal interface;
one or more audio gateway processors that:
gain access to the network by receipt of network communication parameters from a DHCP server via the network interface; and
communicate with an audio server to obtain operational attributes for communication with the audio gateway compatible source via the audio gateway network interface;
the audio server, comprising:
a server network interface that places the outgoing data packets onto a data network and receives incoming data packets from the data network;
one or more server processors that communicates with an audio gateway, wherein the one or more processors operate to:
implement an audio server website;
receive announcements from the audio gateway;
identify the audio gateway as one of a plurality of possible audio gateway types;
authenticate the audio gateway;
display a configuration screen associated with the audio gateway type to permit entry of operational attributes for communication supplied by a user;
send the operational attributes to the audio gateway type to configure operation of the audio gateway; and
maintain a database of audio gateways and the audio gateway's respective operational attributes.

29. The audio communication system according to claim 28, wherein the plurality of possible audio gateway types include at least one of land mobile radio (LMR) audio gateway, radio-telephone audio gateway, telephone system audio gateway, and audio device audio gateway.

30. The audio communication system according to claim 28, wherein at least one of the operational attributes is selected from the following: the status of a verbose mode of operation wherein the audio gateway sends unsolicited status messages to the server via the network interface; an autoanswer mode of operation wherein the audio gateway automatically answers all incoming calls; a callfilter mode of operation wherein the audio gateway only answers calls that match an identity defined by call filter attributes; and a status of an audio buffered mode of operation.

31. The audio communication system according to claim 28, further comprising a management console which displays the configuration screen as a part of the web site.

32. An audio gateway, comprising:
an analog audio signal interface receiving audio signals from an audio gateway compatible source, and providing output audio signals to the audio gateway compatible source, wherein the audio gateway compatible source and output are compatible with a Plain Old Telephone Service (POTS) or Voice Over Internet Protocol (VoIP) telephone interface;
an analog to digital (A/D) converter that converts the audio signals to a digital format;
an audio compressor that processes the digital audio signals to produce data compressed audio signals;
a packetizer that places the compressed audio signals into outgoing data packets;
a network interface that places the outgoing data packets onto a data network and receives incoming data packets from the data network;
a decompresser that receives the incoming compressed data packets from the data network and processes the compressed incoming data packets to produce decompressed audio data;
a digital to analog (D/A) converter that converts the decompressed audio data into an analog audio signal and provides an analog audio signal that is transferred to an output of the analog audio signal interface;
one or more processors that:
gain access to the network by receipt of network communication parameters from a Dynamic Host Configuration Protocol (DHCP) server via the network interface; and
communicate with an audio server to obtain operational attributes for communication with the audio gateway compatible source via the network interface, wherein at least one of the operational attributes comprise the status of a verbose mode of operation wherein the audio gateway sends unsolicited status messages to the server via the network interface.

33. An audio gateway, comprising:
an analog audio signal interface receiving audio signals from an audio gateway compatible source, and providing output audio signals to the audio gateway compatible source, wherein the audio gateway compatible source and output are compatible with a Plain Old Telephone Service (POTS) or Voice Over Internet Protocol (VoIP) telephone interface;
an analog to digital (A/D) converter that converts the audio signals to a digital format;
an audio compressor that processes the digital audio signals to produce data compressed audio signals;
a packetizer that places the compressed audio signals into outgoing data packets;
a network interface that places the outgoing data packets onto a data network and receives incoming data packets from the data network;
a decompresser that receives the incoming compressed data packets from the data network and processes the compressed incoming data packets to produce decompressed audio data;
a digital to analog (D/A) converter that converts the decompressed audio data into an analog audio signal and provides an analog audio signal that is transferred to an output of the analog audio signal interface;
one or more processors that:
gain access to the network by receipt of network communication parameters from a Dynamic Host Configuration Protocol (DHCP) server via the network interface; and
communicate with an audio server to obtain operational attributes for communication with the audio gateway compatible source via the network interface, wherein at least one of the operational attributes comprise the status of an autoanswer mode of operation wherein the audio gateway automatically answers all incoming calls.

34. An audio gateway, comprising:
an analog audio signal interface receiving audio signals from an audio gateway compatible source, and providing output audio signals to the audio gateway compatible source, wherein the audio gateway compatible source and output are compatible with a Plain Old Telephone Service (POTS) or Voice Over Internet Protocol (VoIP) telephone interface;
an analog to digital (A/D) converter that converts the audio signals to a digital format;
an audio compressor that processes the digital audio signals to produce data compressed audio signals;
a packetizer that places the compressed audio signals into outgoing data packets;
a network interface that places the outgoing data packets onto a data network and receives incoming data packets from the data network;
a decompresser that receives the incoming compressed data packets from the data network and processes the compressed incoming data packets to produce decompressed audio data;
a digital to analog (D/A) converter that converts the decompressed audio data into an analog audio signal and provides an analog audio signal that is transferred to an output of the analog audio signal interface;
one or more processors that:
gain access to the network by receipt of network communication parameters from a Dynamic Host Configuration Protocol (DHCP) server via the network interface; and
communicate with an audio server to obtain operational attributes for communication with the audio gateway compatible source via the network interface, wherein at least one of the operational attributes comprise the status of an audio buffered mode of operation.

* * * * *